US012172443B2

(12) United States Patent
Sato et al.

(10) Patent No.: US 12,172,443 B2
(45) Date of Patent: Dec. 24, 2024

(54) INKJET HEAD, PRODUCTION METHOD FOR INKJET HEAD, AND INKJET-RECORDING DEVICE

(71) Applicant: Konica Minolta, Inc., Tokyo (JP)

(72) Inventors: Yohei Sato, Hachioji (JP); Akihisa Shimomura, Atsugi (JP); Yoshinori Yoshida, Hino (JP); Hiroaki Kozai, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 166 days.

(21) Appl. No.: 18/043,709

(22) PCT Filed: Sep. 9, 2020

(86) PCT No.: PCT/JP2020/034053
§ 371 (c)(1),
(2) Date: Mar. 1, 2023

(87) PCT Pub. No.: WO2022/054153
PCT Pub. Date: Mar. 17, 2022

(65) Prior Publication Data
US 2024/0025174 A1 Jan. 25, 2024

(51) Int. Cl.
*B41J 2/14* (2006.01)
*B41J 2/16* (2006.01)

(52) U.S. Cl.
CPC ........... *B41J 2/1606* (2013.01); *B41J 2/1623* (2013.01); *B41J 2/1642* (2013.01);
(Continued)

(58) Field of Classification Search
CPC .. B41J 2/14233; B41J 2/14032; B41J 2/1404; B41J 2/1623; B41J 2202/11; B41J 2202/12
See application file for complete search history.

(56) References Cited

FOREIGN PATENT DOCUMENTS

| | | |
|---|---|---|
| JP | 2006-256223 A | 9/2006 |
| JP | 5645863 B2 | 12/2014 |

(Continued)

OTHER PUBLICATIONS

Hamano H, Machine TranslationofWO-2020044457-A1, 2020 (Year: 2020).*

(Continued)

*Primary Examiner* — Scott A Richmond
(74) *Attorney, Agent, or Firm* — LUCAS & MERCANTI, LLP

(57) ABSTRACT

An inkjet head contains a silicon nozzle substrate having an ink channel surface and an ink ejection surface facing the channel surface, and having a nozzle penetrating from the channel surface to the ejection surface; a channel substrate bonded to the channel surface of the silicon nozzle substrate, and including an ink channel and a substrate body that forms the ink channel; and a liquid-repellent film provided on the ejection surface of the silicon nozzle substrate. The channel substrate includes a through channel that penetrates the substrate body so as to face the nozzle, n-number of individual circulation channels that communicate with the through channel, extend in a direction away from the nozzle, and have a portion overlapping the substrate body in a plan view. A positional relationship between each of the individual circulation channels and the nozzle satisfies a specific Expression 1.

10 Claims, 19 Drawing Sheets

(52) U.S. Cl.
CPC .. *B41J 2/14233* (2013.01); *B41J 2002/14467* (2013.01); *B41J 2202/11* (2013.01); *B41J 2202/12* (2013.01)

(56) References Cited

FOREIGN PATENT DOCUMENTS

| | | | | |
|---|---|---|---|---|
| JP | 2018-202833 | A | 12/2018 | |
| WO | WO-2020044457 | A1 * | 3/2020 | .......... B41J 2/14201 |
| WO | 2020144850 | A1 | 7/2020 | |

OTHER PUBLICATIONS

Japanese Patent Office, Notice of Reasons for Refusal mailed on Jul. 23, 2024, which was issued for related Japanese Patent Application No. 2022-548283, with full English translation, 8 pages.

Japanese Patent Office, Notice of Reasons for Refusal mailed on Mar. 12, 2024, which was issued for related Japanese Patent Application No. 2022-548283, with full English translation, 9 pages.

Extended European Search Report dated Sep. 12, 2023, for the corresponding patent application No. 20953219.1.

International Preliminary Report on Patentability dated Dec. 8, 2020, for the corresponding patent application No. PCT/JP2020/034053, with English translation.

International Search Report for the corresponding patent application No. PCT/JP2020/034053 dated Dec. 8, 2020, with English translation.

* cited by examiner

INKJET HEAD, PRODUCTION METHOD FOR INKJET HEAD, AND INKJET-RECORDING DEVICE

CROSS REFERENCE TO RELATED APPLICATION

This Application is a 371 of PCT/JP2020/034053 filed on Sep. 9, 2020, which is incorporated herein by reference.

TECHNICAL FIELD

The present invention relates to an inkjet head, an inkjet head manufacturing method, and an inkjet recording apparatus.

BACKGROUND ART

A silicon processing process is applied to ensure processing accuracy for the nozzle substrate and the channel substrate of the inkjet head. In particular, in a structure having a circulation channel, a process of processing and bonding a silicon nozzle substrate and a channel substrate having a circulation channel is performed. However, a silicon nozzle substrate may have a substrate thickness of 100 μm or less from the viewpoint of flow path design, which makes handling during manufacturing difficult. Therefore, nozzles are formed on a silicon substrate having a support layer, and the support layer is removed after bonding to the channel substrate. By applying this method, a head chip is manufactured in which the silicon nozzle substrate and the channel substrate are integrated.

On the other hand, a liquid-repellent film is formed on the ejection surface of the silicon nozzle substrate in order to stabilize the ejection direction of the ink droplets and improve the ejection performance.

An embodiment disclosed in Patent Document 1 discloses a manufacturing method in which a liquid-repellent film is formed after bonding a nozzle substrate and a channel substrate. However, since the liquid-repellent film is also formed inside the channel, it is assumed that the wettability is lowered and ejection defects may occur. In order to remove the liquid-repellent film, a process such as oxygen plasma treatment is commonly applied. However, in a channel structure such as that disclosed in Patent Document 1, particularly in a structure having a circulation channel in the upper stage of the nozzle, oxygen ions or oxygen radicals often do not reach the channel, and often it cannot be removed.

Further, Patent Document 2 discloses a method of forming a liquid-repellent film on a nozzle substrate after nozzle processing and bonding it to a channel substrate. However, there is a concern that the liquid-repellent film may unintentionally wrap around the joint surface side of the nozzle substrate during manufacturing. In particular, when an adhesive is used to bond the nozzle substrate and the channel substrate, the reliability of the bonding portion is reduced if the removal of the liquid-repellent film by the oxygen plasma treatment is insufficient. Therefore, it is desirable to form the liquid-repellent film after bonding the nozzle substrate and the channel substrate.

In the process of forming a liquid-repellent film on the ejection surface of the silicon nozzle substrate after bonding the silicon nozzle substrate and the circulation channel substrate, it is required to form the liquid-repellent film only on the ejection surface side of the silicon nozzle substrate.

CITATION LIST

Patent Literatures

Patent Document 1: Japanese Patent No. 5645863
Patent Document 2: JP-A 2006-256223

SUMMARY OF INVENTION

Technical Problem

The present invention has been made in view of the above-described problems and circumstances, and an object thereof is to provide an inkjet head, an inkjet head manufacturing method, and an inkjet recording apparatus that are excellent in ink ejectability.

Solution to Problem

In order to solve the above problems, the present inventor found the following in the process of examining the causes of the above problems. By setting the positional relationship between the nozzles of the silicon nozzle substrate and the circulation channels of the channel substrate to satisfy a specific condition, the inventors have found that it is possible to obtain an inkjet head including a silicon nozzle substrate in which formation of a liquid-repellent film in the channel substrate is suppressed and a channel substrate having a circulation channel, which led to the present invention. That is, the above problems related to the present invention are solved by the following means.

1. An inkjet head comprising: a silicon nozzle substrate having an ink channel surface and an ink ejection surface facing the channel surface, and having a nozzle penetrating from the channel surface to the ejection surface; a channel substrate bonded to the channel surface of the silicon nozzle substrate, and including an ink channel and a substrate body that forms the ink channel; and a liquid-repellent film provided on the ejection surface of the silicon nozzle substrate, wherein the channel substrate includes, as a channel for the ink, a through channel that penetrates the substrate body so as to face the nozzle, n-number of individual circulation channels that communicate with the through channel, extend in a direction away from the nozzle, and have a portion overlapping the substrate body in a plan view seen from an opposite surface side of the channel substrate bonded to the silicon nozzle substrate; and a positional relationship between each of the individual circulation channels and the nozzle satisfies the following Expression 1, $$L \times \tan \phi > H1, \quad \text{Expression 1:}$$

wherein each symbol in Expression 1 has the following meanings in a cross-section obtained by cutting the silicon nozzle substrate and the channel substrate along a plane orthogonal to the channel surface of the silicon nozzle substrate so as to include a center of the nozzle and the individual circulation channel, $\phi$: an angle formed by a straight line connecting a first nozzle end located on the ejection surface that is farther from the individual circulation channel and a second nozzle end located on the channel surface that is closer to the individual circulation channel with the ejection surface, L: a distance from a straight line orthogonal to the ejection surface including the first nozzle end to an intersection farthest from the channel surface among intersections of a formation surface of the through channel and a formation surface of the individual circulation channel in the substrate body, H1: a distance from the ejection surface to an intersection farthest from the channel surface among the intersections of a formation surface of the through channel and a formation surface of the individual circulation channel in the substrate body.

2. The inkjet head according to item 1, wherein a diameter of the nozzle gradually decreases from the channel surface toward the ejection surface, and $\phi$ in Expression 1 is a maximum angle among angles formed with a straight line connecting the first nozzle end and an end of each stage on the channel surface side and close to the individual circulation channel with the ejection surface.

3. The inkjet head according to item 1 or 2, wherein at least two individual circulation channels are positioned on a straight line passing through a center of the nozzle on the channel surface;

the centers of the nozzle and the through channel are aligned, and in a cross-section cut along a plane orthogonal to the channel surface of the silicon nozzle substrate so as to include the nozzle, the center of the through channel, and the two individual circulation channels, the two individual circulation channels are in a symmetrical relationship; and the positional relationship of the individual circulation channels, the through channel, and the nozzles satisfies the following Expression 2, $$(W-D2)/(D1+D2)\times t>H2 \qquad \text{Expression 2:}$$

D1: a diameter of the nozzle on the ejection surface

D2: a diameter of the nozzle on the channel surface t: a thickness of the silicon nozzle substrate H2: a distance from the channel surface to an intersection farthest from the channel surface among the intersections of a formation surface of the through channel and a formation surface of the individual circulation channel in the substrate body, W: a width of the through channel.

4. The inkjet head according to any one of items 1 to 3, wherein the liquid-repellent film is formed with a vapor deposition method.

5. The inkjet head according to any one of items 1 to 4, wherein the silicon nozzle substrate and the channel substrate are bonded with an adhesive.

6. The inkjet head according to any one of items 1 to 5, wherein the liquid-repellent film is composed of a base layer containing a silicon compound and a fluoropolymer layer provided in that order from the silicon nozzle substrate side.

7. The inkjet head according to any one of items 1 to 6, wherein the silicon nozzle substrate has a thickness in the range of 10 to 100 μm.

8. A method for producing the inkjet head according to any one of items 1 to 7 comprising the steps of: a first step of bonding the channel substrate to the channel surface of the silicon nozzle substrate;

after the first step, a second step of forming the liquid-repellent film by a vapor deposition method by arranging a deposition source for the liquid-repellent film on the ejection surface side of the silicon nozzle substrate bonded to the channel substrate;

after the second step, a third step of removing the liquid-repellent film formed on a formation surface of the through channel in the substrate body from the channel substrate side.

9. The method for producing the inkjet head according to item 8, wherein the removal of the liquid-repellent film is performed by irradiating UV ozone or oxygen plasma to the formation surface of the through channel in the substrate body.

10. An inkjet recording apparatus equipped with the inkjet head according to any one of items 1 to 7.

Advantageous Effects of Invention

According to the above-described means of the present invention, in an inkjet head including a silicon nozzle substrate having a liquid-repellent film on the ejection surface side and a channel substrate having a circulation channel, formation of a liquid-repellent film in the channel substrate is suppressed. As a result, it is possible to provide an inkjet head with excellent ink ejectability and a method for manufacturing an inkjet head in which formation of a liquid-repellent film in the channel substrate during manufacturing is suppressed. Further, it is possible to provide an inkjet recording apparatus having an inkjet head with excellent ink ejection properties.

DESCRIPTION OF EMBODIMENTS

Figure 1:
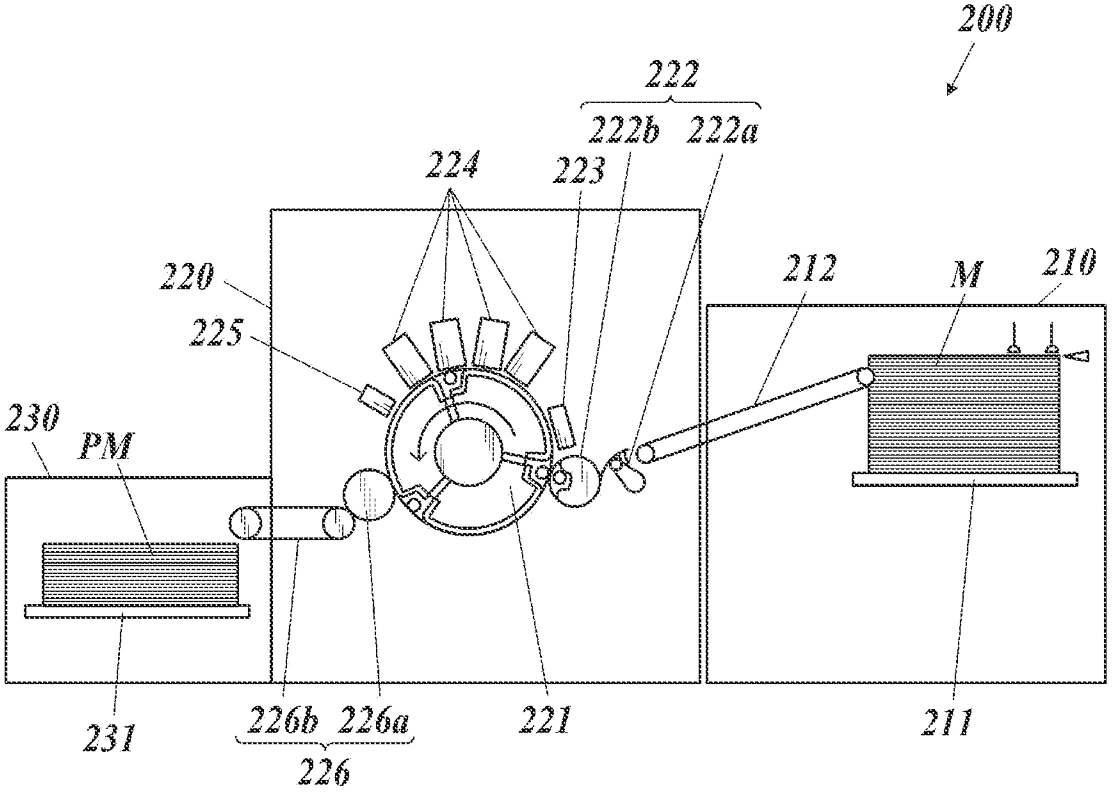
FIG. 1 This is a schematic diagram showing an example of an embodiment of an inkjet recording apparatus of the present invention.

Hereinafter, preferred embodiments of the present invention will be described with reference to the drawings. However, the scope of the invention is not limited to the illustrated examples. In this specification, for convenience of explanation, the direction in which the recording medium M is conveyed is defined as the front-rear direction, and the direction orthogonal to the direction in which the recording medium M is conveyed on the printing surface of the recording medium M, that is, the printing width direction of the inkjet head 100 is defined as the left-right direction, and the thickness direction of the recording medium M is defined as the up-down direction. Also, the arrows in the channels in the drawings indicate the directions in which the ink flows.

Figure 2:
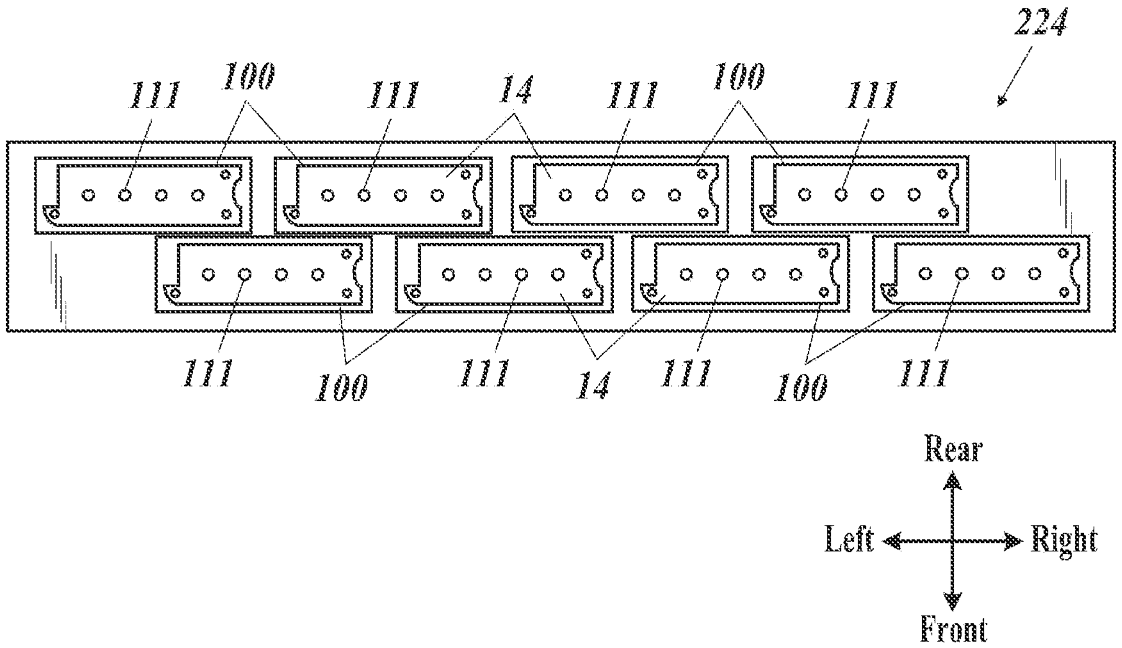
FIG. 2 This is a bottom view of an example of a head unit of the inkjet recording apparatus shown in FIG. 1.
Figure 3:
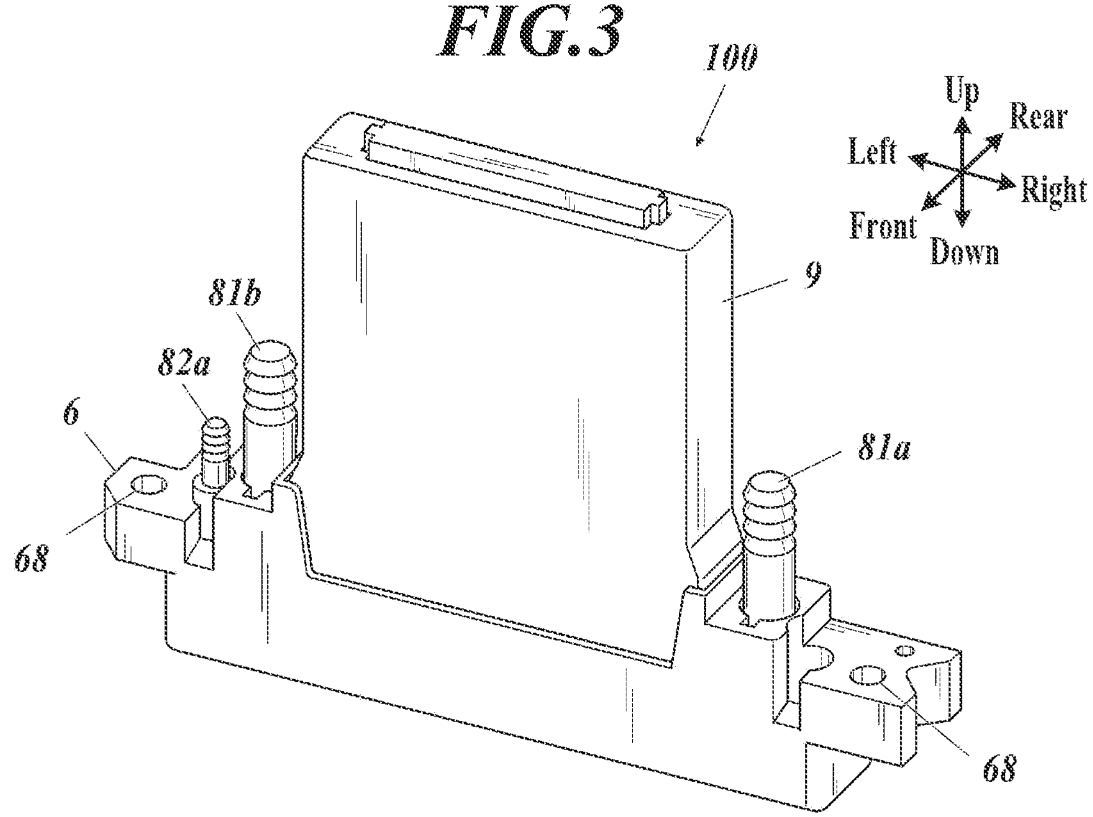
FIG. 3 This is a perspective view showing an example of an embodiment of the inkjet head of the present invention.
Figure 4:
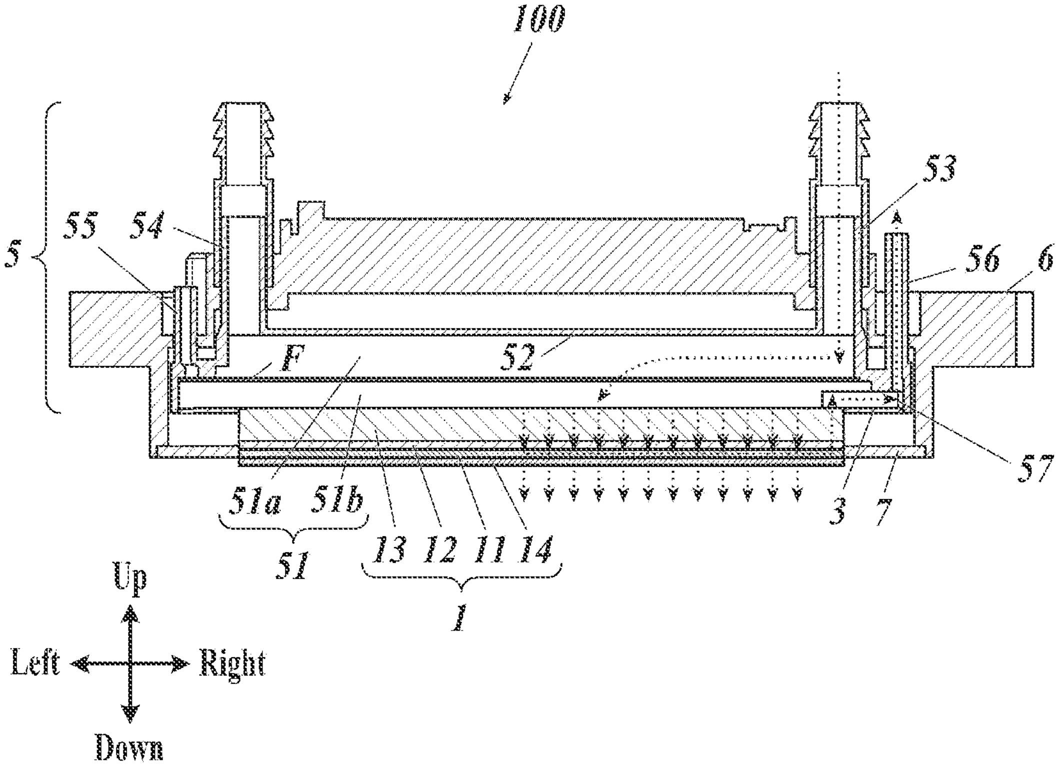
FIG. 4 This is a cross-sectional view in the left-right direction of the lower part of the inkjet head shown in FIG. 3.
Figure 5:
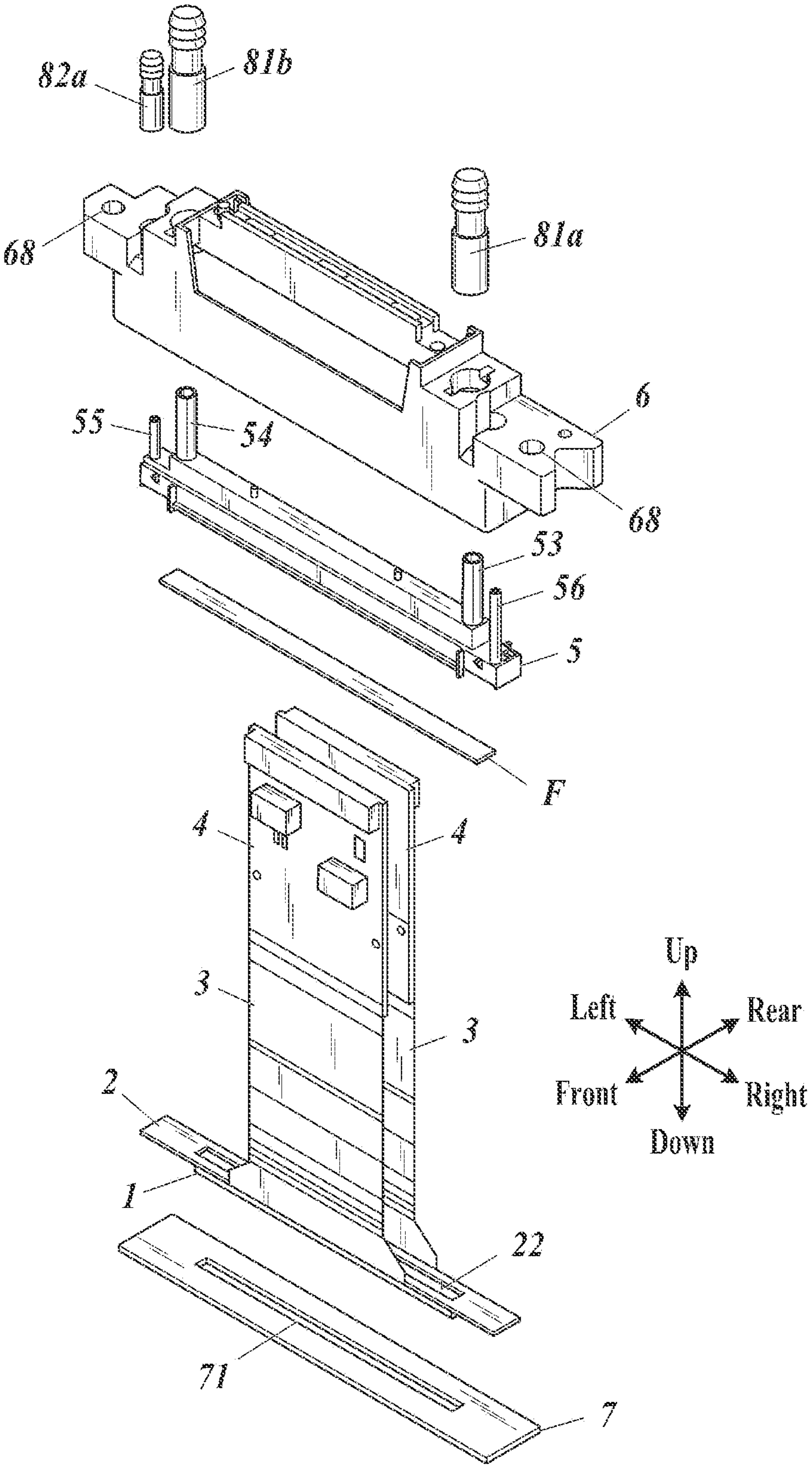
FIG. 5 This is an exploded perspective view of the inkjet head shown in FIG. 3.

The inkjet head of the present invention is used by being mounted on an inkjet recording apparatus. FIG. 3 is a perspective view showing an example of an embodiment of the inkjet head of the present invention, and FIG. 4 and FIG. 5 are cross-sectional views in the left-right direction of the lower portion of the inkjet head 100 shown in FIG. 3 and an exploded perspective view of the inkjet head 100. FIG. 1 is a schematic diagram of an inkjet recording apparatus 200 equipped with, for example, the inkjet head 100 of the present invention shown in FIG. 3. FIG. 2 is a bottom view of a head unit of the inkjet recording apparatus 200 shown in FIG. 1.

[Inkjet Recording Apparatus]

The inkjet recording apparatus 200 shown in FIG. 1 includes a paper feeding unit 210, an image recording unit 220, a paper discharge unit 230, and an ink circulation system (see FIG. 19) as an ink supply device. The inkjet recording apparatus 200 conveys the recording medium M stored in the paper feeding unit 210 to the image recording unit 220, forms an image on the recording medium M in the image recording unit 220, and the recording medium M on which the image is formed is conveyed to the paper discharge unit 230.

The paper feeding unit 210 includes a paper feed tray 211 that stores the recording medium M, and a medium supply unit 212 that conveys and supplies the recording medium M from the paper feed tray 211 to the image recording unit 220. The medium supply unit 212 includes a ring-shaped belt whose inner side is supported by two rollers, and the recording medium M is fed from the paper feed tray 211 by rotating the rollers while the recording medium M is placed on the belt. It is conveyed to the image recording unit 220.

The image recording unit 220 includes a conveying drum 221, a delivery unit 222, a heating unit 223, a head unit 224, a fixing unit 225, and a delivery section 226.

The conveying drum 221 has a cylindrical surface, and an outer peripheral surface thereof serves as a conveying surface on which the recording medium M is placed. The conveying drum 221 conveys the recording medium M along the conveying surface by rotating in the direction of the arrow in FIG. 1 while holding the recording medium M on the conveying surface. In addition, the conveying drum 221 includes a claw portion and a suction portion (not shown). The end of the recording medium M is pressed by the claw. In addition, the recording medium M is held on the conveying surface by drawing the recording medium M toward the conveying surface using the suction unit.

The delivery unit 222 is provided between the medium supply unit 212 of the paper feeding unit 210 and the conveying drum 221, and picks up the recording medium M conveyed from the medium supply unit 212 by holding one end of the recording medium M conveyed from the medium supply unit 212 with the swing arm 222*a*. It is transferred to the conveying drum 221 via the delivery drum 222*b*.

The heating unit 223 is provided between the arrangement position of the delivery drum 222*b* and the arrangement position of the head unit 224, and heats the recording medium M conveyed by the conveying drum 221 so that the temperature of the recording medium M is within a predetermined temperature range. The heating unit 223 has, for example, an infrared heater, and energizes the infrared heater based on a control signal supplied from a control unit (not shown) to cause the heater to generate heat.

The head unit 224 has a rectangular ink ejection surface whose longitudinal direction is the direction orthogonal to the conveying direction of the recording medium M (left-right direction). The ink ejection surface is arranged facing the conveying drum 221 with a predetermined distance therebetween. The longitudinal length of the ink ejection surface of the head unit 224 corresponds to the printing width of the recording medium M.

Based on the image data, the head unit 224 ejects an ink onto the recording medium M at an appropriate timing according to the rotation of the conveying drum 221 holding the recording medium M to form an image. In the inkjet recording apparatus 200 of the present embodiment, for example, four head units 224 respectively corresponding to four color inks of yellow (Y), magenta (M), cyan (C), and black (K) are used to print the recording medium M, which are arranged in the order of Y, M, C, and K at predetermined intervals from the upstream side in the conveying direction of the recording medium M.

In the head unit 224, for example, as shown in FIG. 2, a pair of inkjet heads 100 adjacent in the front-rear direction are arranged in a staggered manner at different positions in the front-rear direction. The inkjet head 100 has a rectangular ink ejection surface whose longitudinal direction is the left-right direction, and on the ink ejection surface, a plurality of nozzles 111 are arranged at approximately equal intervals along the left-right direction. A liquid-repellent film 14 is formed on the ink ejection surface.

Further, the head unit 224 is used in a fixed position with respect to the rotating shaft of the conveying drum 221 when recording an image. That is, the inkjet recording apparatus 200 is an inkjet recording apparatus 200 that performs image recording by a one-pass drawing method using a line head.

The fixing unit 225 has a light emitting unit arranged across the width of the conveying drum 221 in the X direction, and irradiates the recording medium M placed on the conveying drum 221 with energy rays such as ultraviolet rays from the light emitting unit. Then, the ink ejected onto the recording medium M is cured and fixed. The light emitting unit of the fixing unit 225 is arranged downstream of the arrangement position of the head unit 224 and upstream of the arrangement position of the delivery drum 226*a* of the delivery section 226 in the conveyance direction, facing the conveyance surface.

The delivery section 226 has a belt loop 226*b* having a ring-shaped belt whose inside is supported by two rollers, and a cylindrical delivery drum 226*a* that delivers the recording medium M from the conveying drum 221 to the belt loop 226*b*. The recording medium M transferred from the conveying drum 221 onto the belt loop 226*b* by the delivery drum 226*a* is conveyed by the belt loop 226*b* and delivered to the paper discharge unit 230.

The paper discharge unit 230 has a plate-shaped paper discharge tray 231 on which the printed recording medium PM delivered from the image recording unit 220 by the delivery section 226 is placed.

[Inkjet Head]

As shown in FIG. 3, FIG. 4 and FIG. 5, the inkjet head 100 of the present embodiment includes a head chip 1, a wiring board 2 on which the head chip 1 is arranged, a drive circuit board 4 connected to a wiring board 2 via a flexible board 3, a manifold 5 storing ink to be supplied to the head chip 1, a housing 6 housing the manifold 5 inside, a cap receiving plate 7 attached to close the bottom opening of the housing 6, and a cover member 9 attached to the housing 6. The illustration of the manifold 5 is omitted in FIG. 3, and the illustration of the cover member 9 is omitted in FIG. 4 and FIG. 5.

The head chip 1 is a member in the shape of a substantially square prism elongated in the left-right direction, and includes a pressure chamber substrate 13, a channel substrate 12, a silicon nozzle substrate 11, and a liquid-repellent film 14, which are configured to be laminated in this order from the manifold 5 side. The head chip 1 will be described later in detail with reference to FIG. 6 to FIG. 18B. Here, the general configuration of the inkjet head 100 will be described below.

The silicon nozzle substrate 11 is a plate-like body mainly made of silicon (Si), and has nozzles 111 penetrating between both main surfaces. The main surface of the silicon nozzle substrate 11 opposite to the channel substrate 12 constitutes an ink ejection surface. A liquid-repellent film 14 is formed on the ink ejection surface of the silicon nozzle substrate 11.

The channel substrate 12 has a substrate body forming an ink channel and an ink channel formed by the substrate body. The channel substrate 12 has, as an ink channel, at least a through channel that penetrates the substrate body and is located facing the nozzle 111, and an individual circulation channel that is provided for circulating the ink within the inkjet recording apparatus 200.

The pressure chamber substrate 13 is provided with a mechanism for applying pressure to the ink supplied from the manifold 5 to the head chip 1 so as to eject the ink from the nozzles 111 of the silicon nozzle substrate toward the recording medium M through the channel substrate 12. A mechanism for applying pressure may be of a shear-mode type or a bend-mode type. The pressure chamber substrate 13 has, for example, a supply channel for supplying ink from the manifold 5 to the channel substrate 12 and a common circulation channel communicating with the individual circulation channels of the channel substrate 12.

A part of the ink supplied to the head chip 1 is ejected from the nozzles 111 by pressurization, and the remaining part is discharged from the head chip 1 through the individual circulation channels and the common circulation channel. The ink discharged from the head chip 1 is supplied to the head chip 1 again by the ink circulation system (see FIG. 19).

As shown in FIG. 5, a wiring board 2 is arranged on the upper surface of the head chip 1, and two flexible boards 3 connected to a driving circuit board 4 are provided on both edges of the wiring board 2 along the front-rear direction.

The wiring board 2 is formed in a substantially rectangular plate shape elongated in the left-right direction, and has an opening 22 in a substantially central portion thereof. The widths of the wiring board 2 in the left-right direction and the width in the front-rear direction are formed to be larger than those of the head chip 1.

Figure 13:
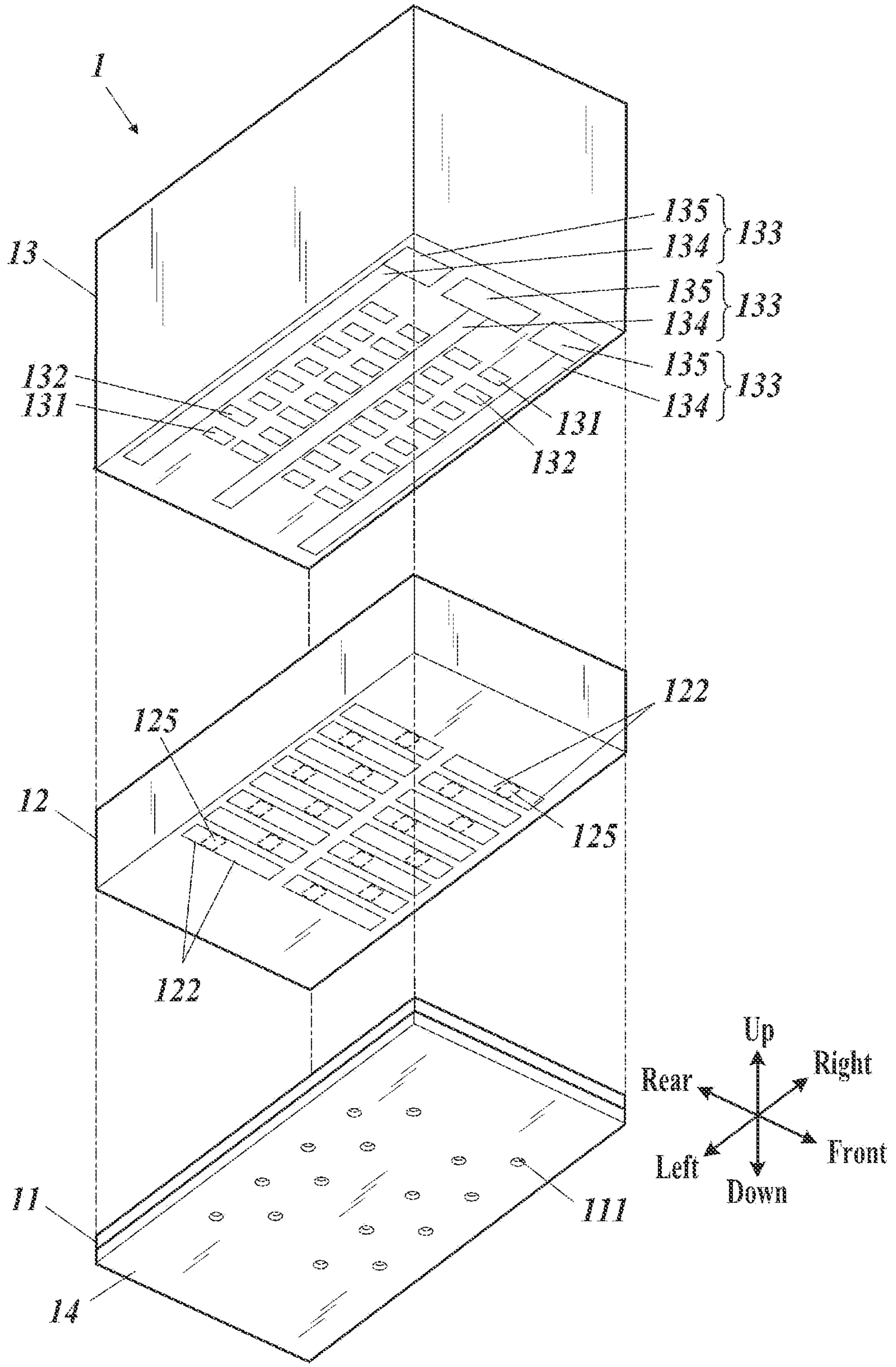
FIG. 13 This is an exploded perspective view of a head chip constituting an inkjet head of the head unit shown in FIG. 12.

The opening 22 is formed in a substantially rectangular shape elongated in the left-right direction, and when the head chip 1 is attached to the wiring board 2, the inlet of the ink supply channel of the pressure chamber substrate 13 in the head chip 1 and the outlet of the common circulation channel, for example, the inlet of each supply channel 131 in the head chip 1 shown in FIG. 13 and the outlet of the second common circulation channel 135 are exposed upward. In this specification, the "inlet" of the ink channel refers to the upstream end, and the "outlet" refers to the downstream end.

The flexible board 3 electrically connects the drive circuit board 4 and the electrode portion of the wiring board 2, and signals from the drive circuit board 4 may be applied to the drive electrodes provided on the partition wall 136 inside the head chip 1 through the flexible board 3.

Further, the lower end of the manifold 5 is attached and fixed to the outer edge of the wiring board 2 by adhesion. That is, the manifold 5 is arranged above the pressure chamber substrate 13 of the head chip 1 and connected to the head chip 1 via the wiring board 2.

The manifold 5 is a member molded from resin, is provided above the pressure chamber substrate 13 of the head chip 1, and stores ink supplied to the head chip 1. Specifically, as shown in FIG. 4, the manifold 5 is elongated in the left-right direction, and is provided with a hollow main body portion 52 constituting an ink reservoir 51 and a first to a fourth ink ports 53 to 56 constituting ink channels. The ink reservoir 51 is divided into two chambers, a first liquid chamber 51*a* on the upper side and a second liquid chamber 51*b* on the lower side, by a filter F for removing dust in the ink.

The first ink port 53 communicates with the right upper end of the first liquid chamber 51*a* and is used to introduce an ink into the ink reservoir 51. A first joint 81*a* is externally inserted at the tip of the first ink port 53. The second ink port 54 communicates with the upper left end of the first liquid chamber 51*a* and is used to remove air bubbles in the first liquid chamber 51*a*.

A second joint 81*b* is externally fitted to the tip of the second ink port 54. The third ink port 55 communicates with the upper left end of the second liquid chamber 51*b* and is used to remove air bubbles in the second liquid chamber 51*b*. A third joint 82*a* is externally inserted at the tip of the third ink port 55. The fourth ink port 56 communicates with a discharge liquid chamber 57 that communicates with the outlet of the common circulation channel of the head chip 1, and the ink discharged from the head chip 1 is discharged to the outside of the inkjet head 100 through the fourth ink port 56.

The housing 6 is, for example, a member formed by die casting using aluminum as a material, and is elongated in the left-right direction. The housing 6 is formed so as to accommodate the manifold 5 to which the head chip 1, the wiring board 2 and the flexible board 3 are attached, and the bottom of the housing 6 is open. Mounting holes 68 for mounting the housing 6 to the main body of the printer are formed at both ends of the housing 6 in the left-right direction.

The cap receiving plate 7 has a nozzle opening 71 elongated in the left-right direction at its substantially central portion. The nozzle substrate 11 is exposed through the nozzle opening 71 and attached so as to close the bottom opening of the housing 6.

In the inkjet head 100 of the present embodiment, the head chip 1 has features. Among the head chip 1, the laminated structure of the channel substrate 12, the silicon nozzle substrate 11, and the liquid-repellent film 14 is particularly distinctive. In the following, the laminate of the channel substrate 12, the silicon nozzle substrate 11, and the liquid-repellent film 14 in the head chip 1, will be described with reference to FIG. 6 to FIG. 11.

Figure 6:
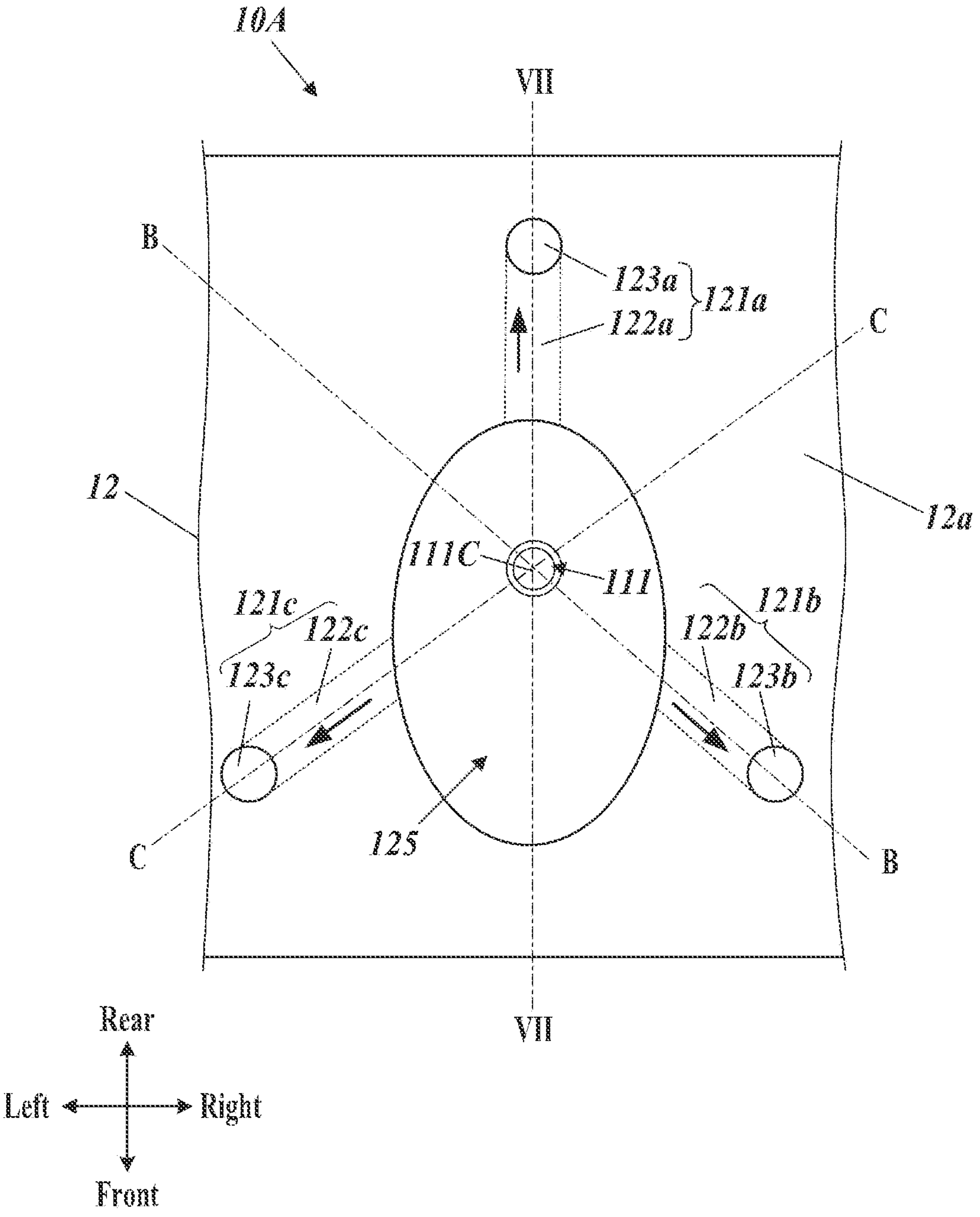
FIG. 6 This is an enlarged plan view of the vicinity of the nozzle of an example of a laminate of a liquid-repellent film, a silicon nozzle substrate, and a channel substrate, viewed from the channel substrate side.
Figure 7:
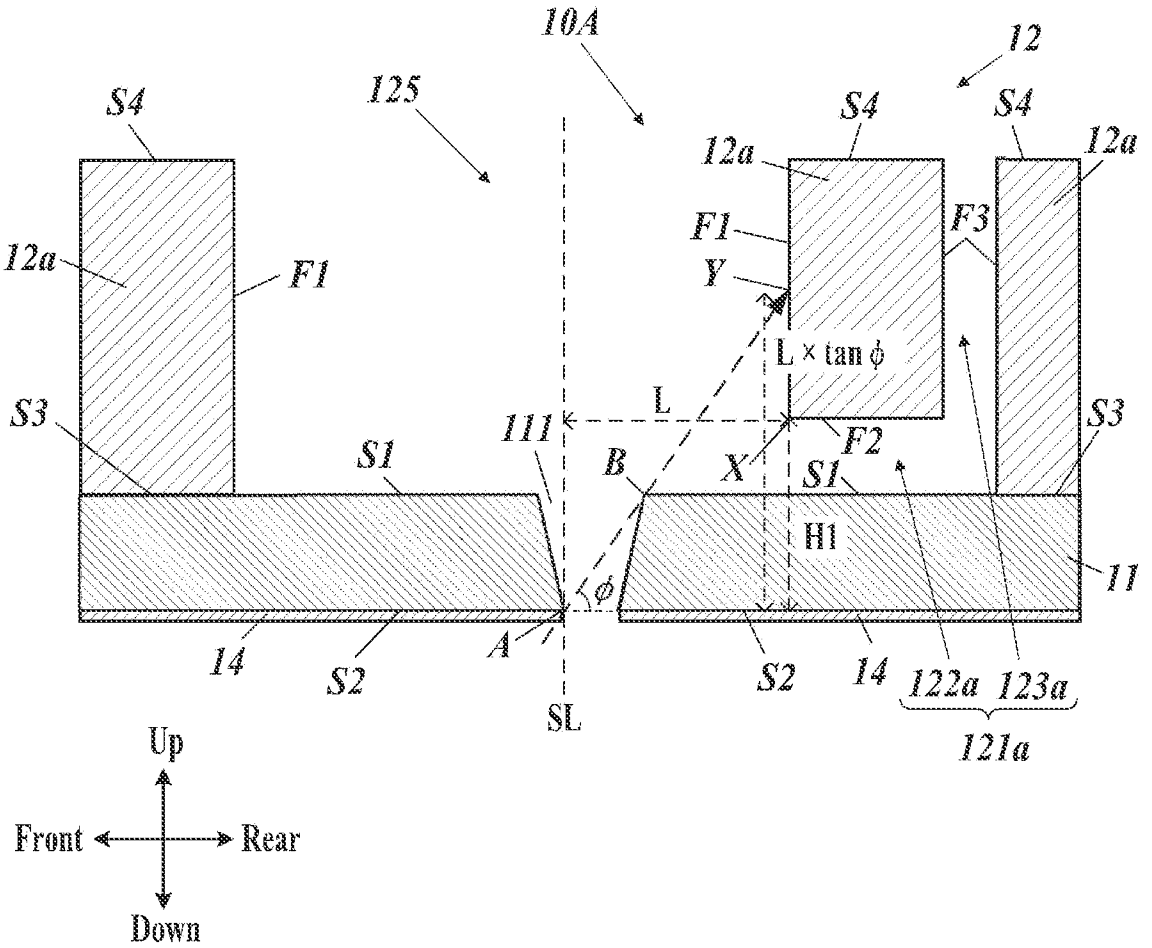
FIG. 7 This is a cross-sectional view of the laminate shown in FIG. 6 cut along VII-VII.
Figure 8A:
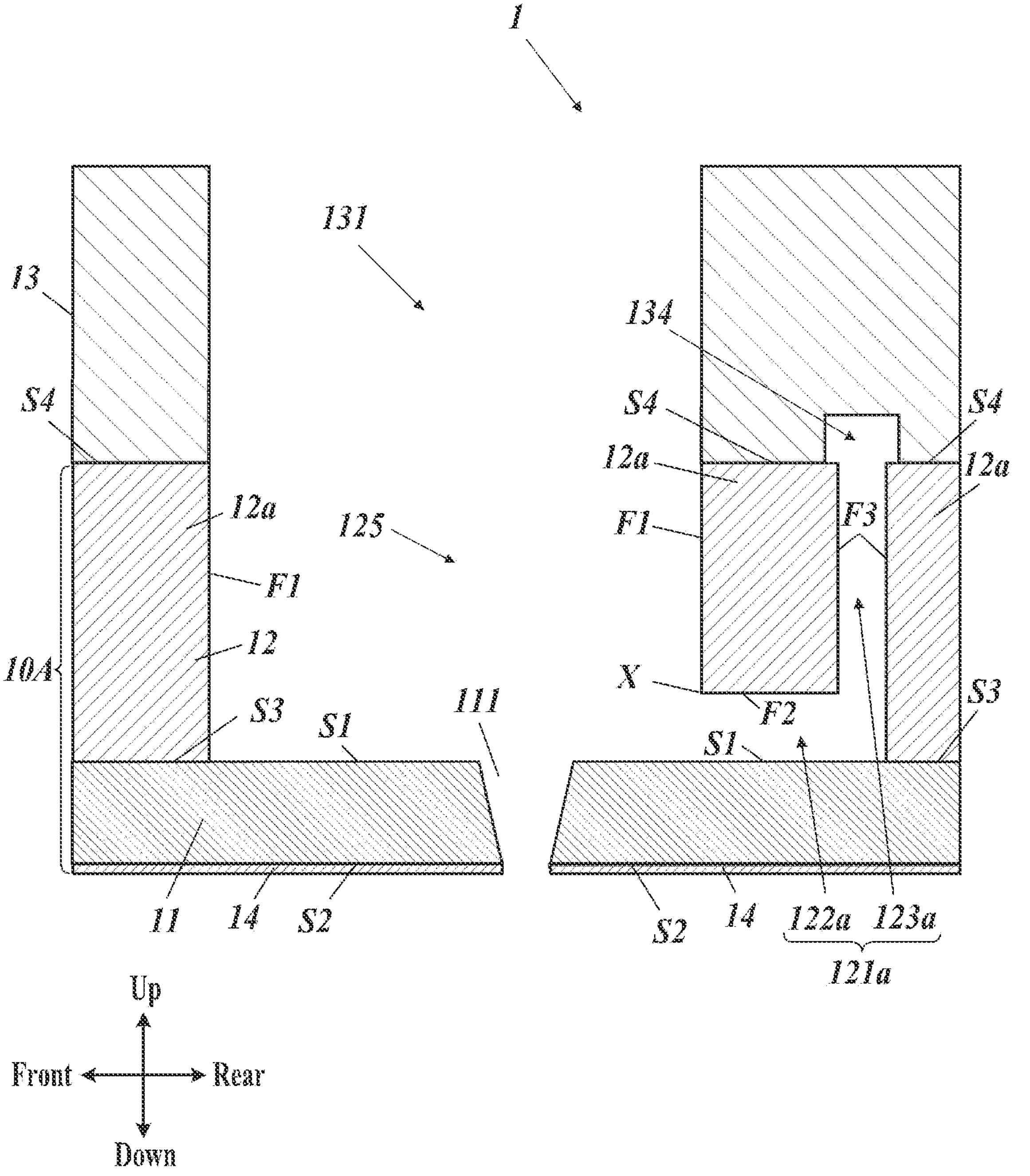
FIG. 8A This is a cross-sectional view of an example of a shear-mode head chip using the laminate shown in FIG. 6 and FIG. 7.
Figure 8B:
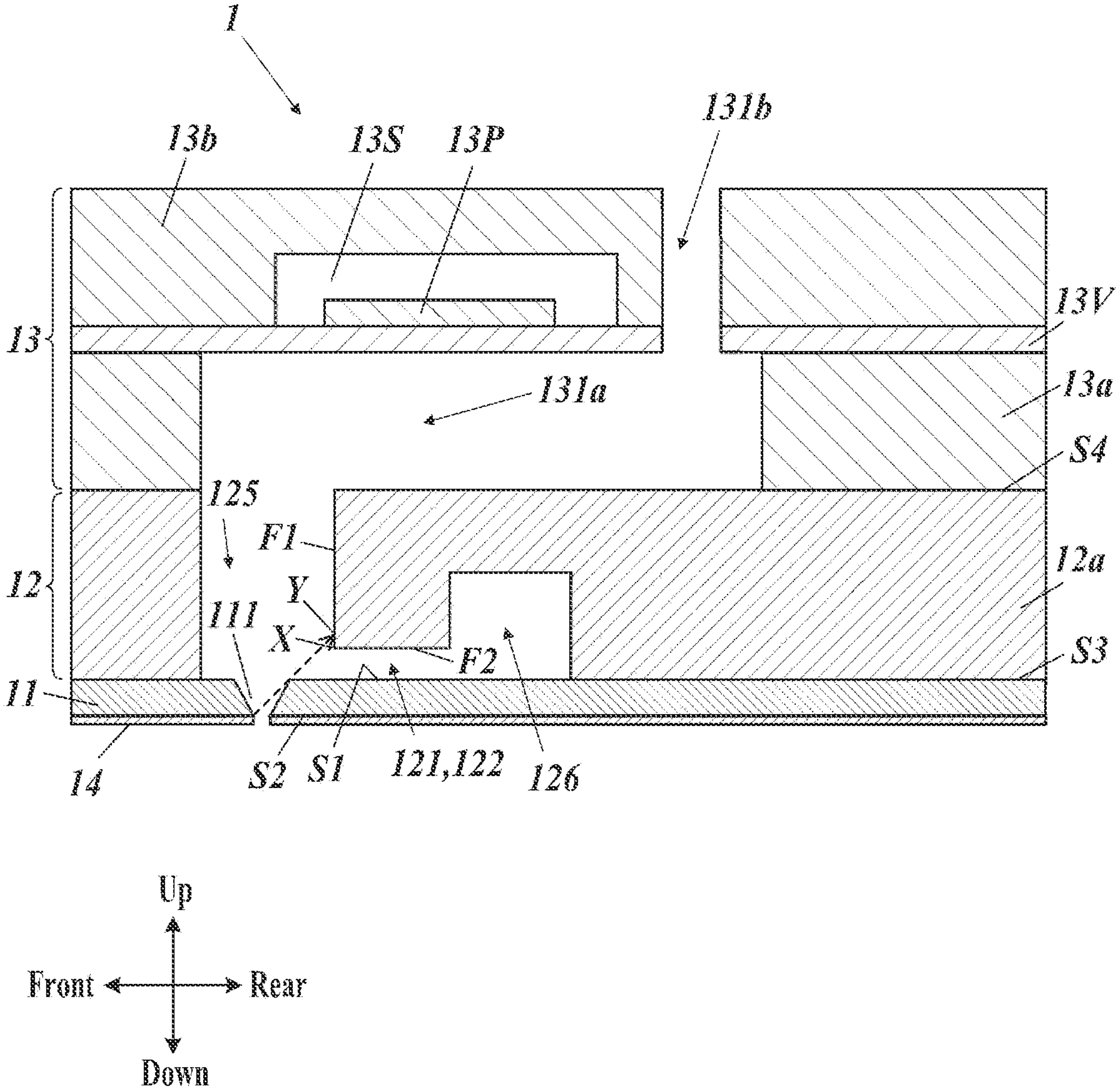
FIG. 8B This is a cross-sectional view of an example of an embodiment of a bend-mode type head chip.

FIG. 6 shows an enlarged plan view of the vicinity of the nozzle 111 of the laminate 10A, which is an example of the laminate of the channel substrate 12, the silicon nozzle substrate 11, and the liquid-repellent film 14, viewed from the channel substrate 12 side in the inkjet head 100 shown in FIG. 2. FIG. 7 is a cross-sectional view of the laminate 10A shown in FIG. 6 cut along line VII-VII. FIG. 8A is a cross-sectional view of an example of a shear-mode type head chip using the laminate 10A shown in FIG. 6 and FIG. 7. FIG. 8B shows a cross-sectional view of an example embodiment. It shows a bend-mode head chip using a laminate of a channel substrate 12, a silicon nozzle substrate 11, and a liquid-repellent film 14, which has a configuration different from that of the laminate 10A, particularly a configuration in which the channel substrate 12 is different. The laminate shown in FIG. 8B is also a laminate used in the inkjet head 100 shown in FIG. 2, like the laminate 10A.

The laminate 10A has an ink channel surface S1 and an ink ejection surface S2 opposite the channel surface S1, and it has a silicon nozzle substrate 11 having nozzles 111 penetrating from the channel surface S1 to the ejection surface S2; a channel substrate 12 provided with a substrate body 12*a* having an ink channel and a forming surface of the ink channel, which is joined to the channel surface S1 of the silicon nozzle substrate 11; and a liquid-repellent film 14 provided on the ejection surface S2 of the silicon nozzle substrate 11.

As shown in FIG. 2, a plurality of nozzles 111 are provided on a silicon nozzle substrate 11 that is rectangular in a plan view. The nozzles 111 are formed in a row along the long side direction (left-right direction) of the silicon nozzle substrate 11 and are positioned substantially at a center of the short side direction (front-back direction). The nozzle 111 has an inverted truncated cone shape, and the diameter on the side of the channel surface S1 is larger than the diameter on the side of the ejection surface S2 in a plan view.

The diameter of the nozzles 111 is adjusted according to the specifications of the inkjet head 100. The diameter of the nozzles 111 may be generally 20 to 200 μm on the channel S1 side, and generally 10 to 100 μm on the ejection surface S2 side. As shown in FIG. 7, the angle $\phi$ used in Expression 1 is determined by the height of the nozzle 111 (thickness of the silicon nozzle substrate 11) and the diameter of the nozzle 111 on the channel surface S1 side and the ejection surface S2 side. The shape of height and diameter of the nozzle 111 are adjusted so that Expression 1 holds true.

Figure 9A:
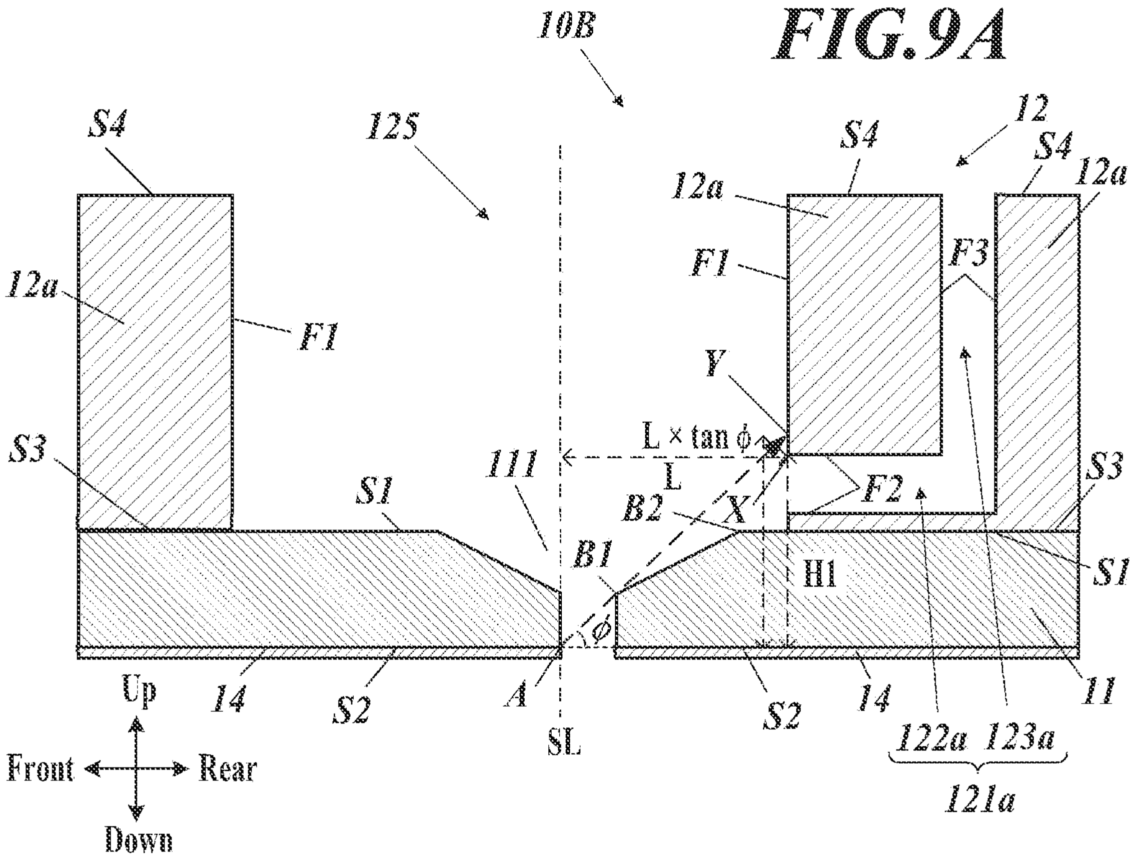
FIG. 9A This is a cross-sectional view of a modified example of a laminate of a liquid-repellent film, a silicon nozzle substrate, and a channel substrate.
Figure 9B:
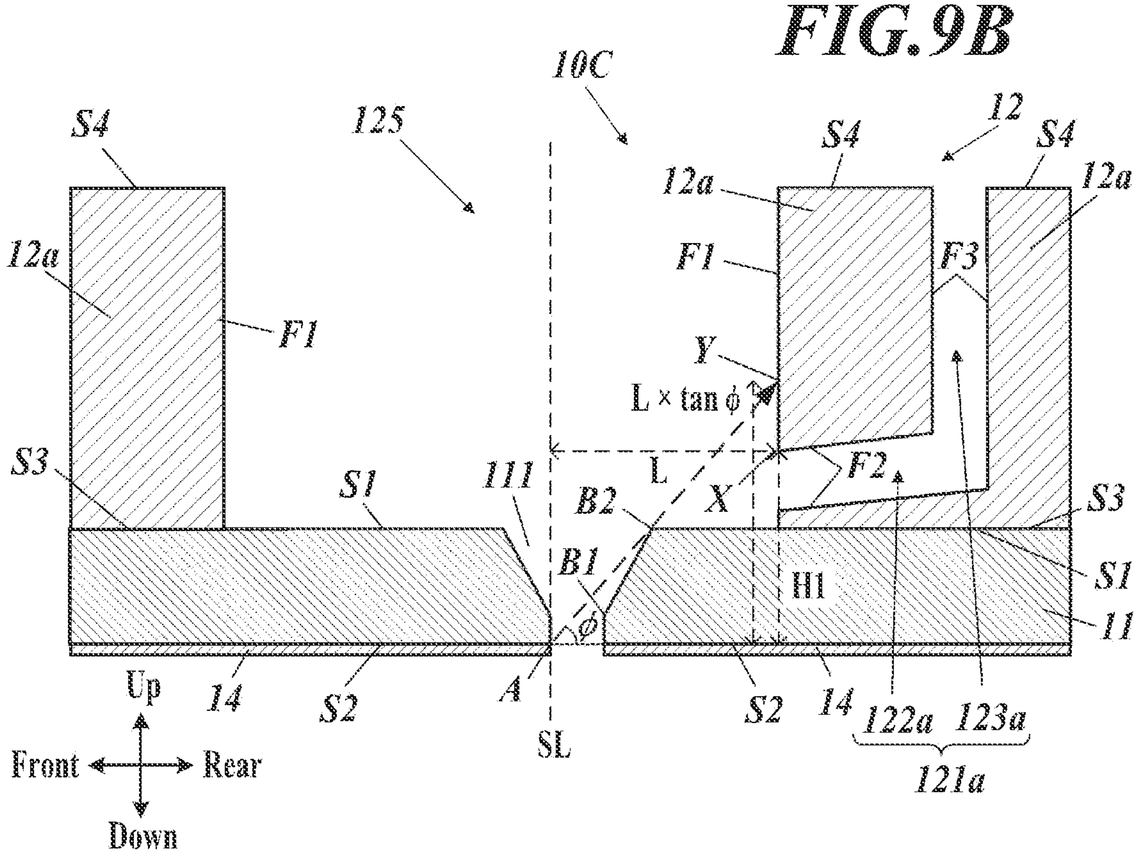
FIG. 9B This is a cross-sectional view of a modified example of a laminate of a liquid-repellent film, a silicon nozzle substrate, and a channel substrate.

The number, formation position, and shape of the nozzles 111 on the silicon nozzle substrate 11 are not limited thereto. Depending on the design of the inkjet head 100, they are adjusted appropriately so that at least Expression 1 is valid. For example, the number of nozzles 111 and the formation position of the nozzles 111 may be adjusted as shown in the example shown in FIG. 16 below, where a plurality of nozzles 111 may be arranged in four rows per row so as to be parallel to the long side direction. Moreover, as for the shape of the nozzle 111, as shown in FIG. 9A and FIG. 9B, the cross-section may be a shape that gradually decreases from the channel surface S1 toward the ejection surface S2.

The silicon nozzle substrate 11 may be a plate-like body composed mainly of silicon (Si), for example, a substrate whose surface is made of single-crystal silicon with a (100) surface of the substrate 11 may be cited. As the silicon nozzle substrate 11, an SOI (Silicon On Insulator) substrate having an S1 active layer and a support layer that forms the nozzle 111 and sandwiching an oxide film layer (also referred to as a BOX layer) between the active layer and the support layer may also be used. PS By configuring the nozzle substrate with a material mainly composed of silicon, the nozzles may be processed with high precision, and the nozzle substrate may be formed with less positional errors and less variation in nozzle shape.

Although the thickness of the silicon nozzle substrate 11 is not particularly limited, it is preferable that the thickness is within the range of 10 to 100 μm because the effects of the present invention are more remarkable. More preferably, the thickness of the silicon nozzle substrate 11 is in the range of 30 to 60 μm.

The channel substrate 12 has, as an ink channel, a through channel 125 that penetrates the substrate body 12*a* so as to face the nozzle 111, and three individual circulation channels 121*a*, 121*b*, and 121*c* that communicate with the through channel 125, extend in a direction away from the nozzle 111, and have a portion overlapping the substrate body 12*a* in a plan view seen from the opposite side of the surface S3 of the channel substrate 12 joined to the silicon nozzle substrate 11.

The surface S3 where the channel substrate 12 is bonded to the silicon nozzle substrate 11 is specifically the lower surface S3 of the substrate body 12*a*. The upper surface S4 of the substrate body 12*a* is joined to the lower surface of the pressure chamber substrate 13, for example, as shown in FIG. 8A and FIG. 8B.

The substrate body 12*a* of the channel substrate 12 is preferably made of silicon (Si), stainless steel (SUS) or 42 alloy, from the viewpoint that the through channel 125 and the individual circulation channels 121*a*, 121*b*, and 121*c* are easy to process (high accuracy), and that the ink temperature can be easily kept uniform due to the high thermal conductivity. The same material may also be employed for the pressure chamber substrate 13. It is preferred that the material constituting the substrate body 12*a* of the channel substrate 12 and the material constituting the pressure chamber substrate 13 are materials having close coefficients of thermal expansion.

Bonding of the pressure chamber substrate 13 to the channel substrate 12, and the channel substrate 12 to the silicon nozzle substrate 11 may be made, for example, with a known adhesive. The adhesive is selected and used from the known adhesives according to the constituent materials of each substrate.

FIG. 8A is a cross-sectional view schematically showing a case where the head chip 1, for example, in which the pressure chamber substrate 13 is laminated on the laminate 10A, has a shear-mode type pressure mechanism. The pressure chamber substrate 13 has an ink supply channel 131 communicating with the through channel 125 and having substantially the same diameter as the through channel 125, and a common circulation channel 134 communicating with the individual circulation channel 121*a*. In the shear-mode pressure mechanism, for example, the through channel 125 and the supply channel 131 function as pressure chambers. Specifically, in the pressure chamber substrate 13, for example, the partition wall partitioning each supply channel 131 in the left-right direction is repeatedly displaced in a shear-mode type by the drive electrode, thereby pressure is applied to the ink in the chamber, and the ink is ejected from the nozzle 111.

At the same time, the ink in the pressure chamber is also discharged to the individual circulation channels 121*a*, 121*b*, and 121*c*. The common circulation channel 134 is a channel which is disposed to extend in the left-right direction so as to communicate with each individual circulation channel 121*a* corresponding to each nozzle 111, and is a channel which collectively discharges the ink discharged from each individual circulation channel 121*a* to the outside of the head chip 1. Similarly, each of the individual circulation channels 121*b* and 121*c* also communicates with another common circulation channel 134 included in the pressure chamber substrate 13, and the ink collected in the common circulation channel 134 is discharged to the outside of the head chip 1.

FIG. 8B shows a cross-section of an example embodiment of a head chip with a bend-mode type pressure mechanism. The head chip 1 shown in FIG. 8B has: a silicon nozzle substrate 11 having a channel surface S1, an ejection surface S2 of ink, and nozzles 111 penetrating from a channel surface S1 to an ejection surface S2; a channel substrate 12 bonded to the channel surface S1 of the silicon nozzle substrate 11; a pressure chamber substrate 13 bonded to a surface S4 of the channel substrate 12 opposite to the surface S3 bonded to the silicon nozzle substrate 11; and a liquid-repellent film 14 provided on the ejection surface S2 of the silicon nozzle substrate 11.

In the head chip 1 shown in FIG. 8B, the channel substrate 12 has, as an ink channel, a through channel 125 penetrating the substrate body 12*a* so as to face the nozzle 111, an individual circulating channel 121 communicating with the through channel 125, extending in a direction away from the nozzle 111, and having a portion overlapping with the substrate body S3 in a plan view seen from the opposite side of the surface 12*a* bonded to the silicon nozzle substrate 11 of the channel substrate 12, and a common circulating channel 126 communicating with the individual circulating channel 121.

In the head chip 1 shown in FIG. 8B, the channel substrate 12 may have a plurality of individual circulating channels 121 communicating with the through channel 125 positioned to face the nozzles 111 in the same manner as the laminate 10A. In this case, a cross-section of the head chip 1 cut along a plane orthogonal to the channel surface 111C of the silicon nozzle substrate 11 so as to include the central S1 of the nozzles 111 and the individual circulating channel 121 is configured to have the same shape in each individual circulating channel 121.

The common circulating channel 126 has the same function as that of the common circulating channel 134 provided in the pressure chamber substrate 13 in the head chip 1 shown in FIG. 8A. In the head chip 1 shown in FIG. 8B, the common circulating channel is provided as the common circulating channel 126 in the channel substrate 12. The common circulating channel 126 is a channel disposed to extend in the left-right direction so as to communicate with each corresponding individual circulating channel 121, and is a channel for collectively discharging the ink discharged from each individual circulating channel 121 to the outside of the head chip 1.

Therefore, in the channel substrate 12 of the head chip 1 shown in FIG. 8B, the individual circulating channel 121 includes only the connecting portion 122 while the individual circulating channel 121 of the head chip 1 shown in FIG. 8A includes the connecting portion 122 and the extension portion 123 as will be described later.

The pressure chamber substrate 13 included in the head chip 1 illustrated in FIG. 8B has in the order from the channel substrate 12 side: a pressure chamber layer 13*a*, a diaphragm 13V, and a spacer layer 13*b* having a space 13S in contact with the diaphragm 13V and having a piezoelectric element 13P on the diaphragm 13V inside the space 13S.

The pressure chamber substrate 13 includes an ink supply channel 131 that penetrates the spacer layer 13*b*, the diaphragm 13V, and the pressure chamber layer 13*a* and communicates with the through channel 125 of the channel substrate 12. The supply channel 131 is present as a supply channel 131*a* that has a larger diameter and functions as a main pressure chamber in the pressure chamber layer 13*a*. The supply channel 131 exists as a supply channel 131*b* having a smaller diameter than the supply channel 131*a* in the spacer layer 13*b* and the diaphragm 13V. An inlet of the supply channel 131*b* serves as an inlet of ink supplied from the manifold 5 to the head chip 1, and the ink is supplied to a pressure chamber composed of the supply channel 131*a* and the through channel 125.

In the head chip 1 shown in FIG. 8B, in the pressure chamber substrate 13, due to the bend-mode pressure-applying mechanism, the piezoelectric element 13P is displaced by the drive electrodes, and the diaphragm 13V is thereby displaced, whereby the ink in the pressure chamber (the supply channel 131*a* and the through channel 125) is pressurized and the ink is ejected from the nozzle 111.

In addition, in the laminate 10A of the liquid-repellent film 14, the silicon nozzle substrate 11, and the channel substrate 12 of the head chip 1 shown in FIG. 8A, it is explained that the positional relationship between the individual circulation channel 121 and the nozzle 111 satisfies Expression 1. Also in the laminate 10B of the liquid-repellent film 14, the silicon nozzle substrate 11, and the channel substrate 12 of the head chip 1 shown in FIG. 8B, the positional relationship between the individual circulation channel 121 and the nozzle 111 satisfies Expression 1. Similarly to what will be described later, in FIG. 8B, a position at a height of $L\times\tan\phi$ on the formation surface F1 of the through channel 125 is indicated by Y. In the cross-sectional view of FIG. 8B, it can be seen that the positional relationship between the individual circulating channel 121 and the nozzle 111 satisfies Expression 1. That is, it is seen that the position Y at the height of L×tan ϕ is located above the inlet of the individual circulating channel 121.

Regardless of whether the pressure chamber substrate 13 is a shear-mode type or a bend-mode type pressure applying mechanism, the ink present in the through channel 125 is pressurized and ejected from the nozzle 111. In the channel substrate 12 of the laminate 10A, the size and position of the through channel 125 in a plan view are not particularly limited as long as the through channel 125 is formed to pass through the substrate body 12*a* and is located at a position facing the nozzle 111. The channel substrate 12 forms an ink channel by the inner wall surface of the substrate body 12*a*. The inner surface is referred to as a formation surface of an ink channel. A formation surface of the through channel 125 in the substrate body 12*a* is indicated by F1.

The number of through channel 125 corresponding to one nozzle 111 is normally one. In the channel substrate 12 shown in FIG. 6 and FIG. 7, the through channel 125 communicates with three individual circulating channels 121*a*, 121*b*, and 121*c*. The number n of individual circulating channel corresponding to one through channel 125 is not particularly limited as long as it is 1 or more. The number is preferably 1 to 4, and more preferably 1 or 2 from the viewpoint of ease of production.

The individual circulating channels 121*a*, 121*b*, and 121*c* each have portions 122*a*, 122*b*, and 122*c* (hereinafter also referred to as "connecting portions") that communicate with the through channel 125 and extend in a direction away from the nozzle 111. The connecting portions 122*a*, 122*b*, and 122*c* are portions that overlap the substrate body 12*a* in a plan view seen from the opposite side of the surface S3 of the channel substrate 12 joined to the silicon nozzle substrate 11, that is, in a plan view seen from the top surface S4 side of the substrate body 12*a*.

In the channel substrate 12 shown in FIG. 6 and FIG. 7, the individual circulation channels 121*a*, 121*b*, and 121*c* each further includes extension portions 123*a*, 123*b*, and 123*c* that extend upward from ends of the connecting portions 122*a*, 122*b*, and 122*c* farthest from the nozzle 111 to reach the position of the upper surface S4 of the substrate body 12*a*. In the substrate body 12*a* shown in FIG. 7, the formation surfaces of the connecting portions 122*a*, 122*b*, and 122*c* of the individual circulating channels 121*a*, 121*b*, and 121*c* are denoted by F2. Further, the formation surfaces of the extension portions 123*a*, 123*b*, and 123*c* are denoted by F3. Hereinafter, when referring to the individual circulating channel regardless of the number, the individual circulating channel 121 is used. Similarly, when referring to the connecting portion and the extension portion regardless of the number, the connecting portion 122 and the extension portion 123 are used.

In the channel substrate 12 shown in FIG. 6 and FIG. 7, the connecting portions 122*a*, 122*b*, and 122*c* of the individual circulating channels 121*a*, 121*b*, and 121*c* have a rectangular channel cross-section and are provided so as to be parallel to the channel surface S1 with the channel surface S1 of the silicon nozzle substrate 11 as a lower surface. The upper surface of the connecting portions 122*a*, 122*b*, and 122*c* is the formation surface F2 of the substrate body 12*a* provided to face the channel surface 51.

The shape and formation position of the channel cross-section of each of the connecting portions 122*a*, 122*b*, and 122*c* are not limited thereto as long as the condition of the following Expression 1 is satisfied. For example, the channel cross-section of each of the connecting portions 122*a*, 122*b*, and 122*c* may have a circular shape including an elliptical shape or a polygonal shape. In addition, as shown in FIG. 9A, the upper and lower surfaces of the connecting portions 122*a*, 122*b*, and 122*c* may be a pair of formation surfaces F2 formed on the substrate body 12*a* so as to be parallel to the channel surface S1 of the silicon nozzle substrate 11 and face each other with a predetermined distance therebetween.

In that case, as shown in FIG. 9B, the upper and lower surfaces of the connecting portions 122*a*, 122*b*, and 122*c* may be provided at a predetermined angle with respect to the channel surface S1 of the silicon nozzle substrate 11.

In the laminate 10A, the liquid-repellent film 14 is formed to cover the entire ejection surface S2 of the silicon nozzle substrate 11. The liquid-repellent film 14 is not formed on member surfaces other than the ejection surface S2, Specifically, it is not formed on the channel surface S1 of the silicon nozzle substrate 11, the nozzle 111 the formation surface of the nozzle 111, and the inner wall surface of the channel substrate 12. The inner wall surfaces of the channel substrate 12 are, for example, the formation surface F1 of the through channel 125, the formation surface F2 of the connecting portions 122*a*, 122*b*, and 122*c* of the individual circulation channels 121*a*, 121*b*, and 121*c*, and the formation surface F3 of the extension portions 123*a*, 123*b*, and 123*c*.

In the laminate 10A according to the present invention, the positional relationship between each of the individual circulating channels 121*a*, 121*b*, and 121*c* and the nozzle 111 satisfies the following Expression 1.

$$L \times \tan\phi > H1 \quad \text{Expression 1:}$$

Each symbol in Expression 1 indicates the following meanings in a cross-section obtained by cutting the silicon nozzle substrate 11 and the channel substrate 12 along a plane orthogonal to the channel surface S1 of the silicon nozzle substrate 11 so as to include the center 111C of the nozzle 111 and the individual circulation channels 121*a*, 121*b*, or 121*c*. The cross-sectional view of the laminate 10A shown in FIG. 7 is a cross-section obtained by cutting the laminate 10A along a plane orthogonal to the channel surface S1 of the silicon nozzle substrate 11 so as to include the center 111C of the nozzle 111 and the individual circulation channels 121*a*. Expression 1 will be described below with reference to the cross-sectional view shown in FIG. 7.

ϕ is an angle formed by a straight line connecting a first nozzle end (a nozzle end indicated by "A" in FIG. 7, hereinafter also referred to as a "nozzle end A") located on an ejection surface S2 on a side farther from an individual circulation channel 121*a* and a second nozzle end (a nozzle end indicated by "B" in FIG. 7, hereinafter also referred to as a "nozzle end B") located on a channel surface S1 on a side closer to the individual circulation channel 121*a* with the ejection surface S2.

L is a distance from a straight line SL orthogonal to the ejection surface S2 including the nozzle end A to an intersection X farthest from the channel surface S1 among the intersections of the formation surface F1 of the through channel 125 and the formation surface of the individual circulation channels 121*a* in the substrate body 12*a*. As described above, the individual circulation channel 121*a* is composed of the connecting portion 122*a* communicating with the through channel 125 and the extension portion 123*a* extending from the connecting portion 122*a*. Therefore, the intersection of the formation surface F1 of the through channel 125 and the formation surface of the individual circulation channel 121*a* in the substrate body 12*a* is an intersection of the formation surface F1 of the through channel 125 and the formation surface F2 of the connecting portion 122*a* in the substrate body 12*a*.

In the channel substrate 12 contained in the laminate 10A, the connecting portion 122*a* of the individual circulation channels 121*a* uses the channel surface S1 of the silicone nozzle substrate 11 as a lower surface. Therefore, in the cross-section shown in FIG. 7, there is one intersection between the formation surfaces F1 and F2, and that point is the farthest intersection X from the channel surface S1. The intersection X is the farthest point from the channel surface S1 at the boundary of the through channel 125 and the connecting portion 122*a*. In other words, the intersection X represents the farthest point from the channel surface S1 at the inlet of the connecting portion 122*a*. For example, as shown in FIG. 9A and FIG. 9B, the formation surface F1 and the formation surface F2 have two intersections, of which the farthest point from the channel surface S1 is used as the intersection X as an indicator in the present invention.

H1 is a distance from the ejection surface S2 to an intersection X farthest from the channel surface S1 among the intersections of the formation surface F1 of the through channel 125 and the formation surface of the individual circulating channel 121*a* in the substrate body 12*a*.

In FIG. 7, the length of L×tan ϕ and the length of the H1 are indicated by a double-headed arrow of a broken line side by side. Hereinafter, a position separated by L×tan ϕ upward from the ejection surface S2 is referred to as a height of L×tan ϕ, and a position of the height of L×tan ϕ on the formation surface F1 of the through channel 125 is indicated by Y in FIG. 7.

As shown in FIG. 7, in the laminate 10A, it is understood that the positional relationship between the individual circulating channel 121*a*, to be specific, between the inlet of the connecting portion 122*a* of the individual circulating channel 121*a* and the nozzle 111 satisfies Expression 1. In other words, in FIG. 7, the position Y at the height of L×tan ϕ on the formation surface F1 of the through channel 125 is located above an intersection X farthest from the channel surface S1 among the intersections of the formation surface F1 of the through channel 125 and the formation surfaces of the individual circulation channel 121*a* in the substrate body 12*a*. When the positional relationship between the inlet of the connecting portion 122*a* of the individual circulation channel 121*a* and the nozzle 111 satisfies Expression 1, during formation of the liquid-repellent film 14 on the ejection surface S2, the liquid-repellent film is not formed on the inner wall surface of the channel substrate 12 where it is difficult to remove, and the liquid-repellent film formed on the inner wall surface of the channel substrate 12 can be efficiently removed by subsequent processing.

As the liquid-repellent film 14, for example, a liquid-repellent film formed of a fluoropolymer layer is exemplified. It is preferable that the liquid-repellent film 14 further includes a base layer containing a silicone compound and a fluoropolymer layer provided in this order from the side of the ejection surface S2 of the silicone nozzle substrate 11.

Here, the liquid-repellent film 14 may be formed, for example, on the ejection surface S2 of the silicon nozzle substrate 11 alone before the silicon nozzle substrate 11 and the channel substrate 12 are bonded to each other, or may be formed on the ejection surface S2 of the silicon nozzle substrate 11 in the laminate after the silicon nozzle substrate 11 and the channel substrate 12 are bonded to each other. However, it is difficult to handle the silicon nozzle substrate 11 by itself, and in particular, it is difficult to process the silicon nozzle substrate 11 of the above preferred thickness by itself. Therefore, the formation of the liquid-repellent film 14 is usually performed on the laminate after the silicon nozzle substrate 11 and the channel substrate 12 are joined.

As the fluoropolymer layer, a layer formed using a raw fluoropolymer having a hydrolyzable silyl group and a fluorine atom substituted long chain hydrocarbon group or a fluorine atom substituted polyoxyalkylene group is preferred. As the raw fluoropolymer, a perfluoropolyether compound having a hydrolyzable silyl group is preferred. It is more preferred that the perfluoropolyether compound has a fluoroalkyl group, preferably a perfluoroalkyl group, at an end different from that having a hydrolyzable silyl group. As the raw fluoropolymer, commercially available products, such as OPTOOL (registered trademark, Daikin Industries, Ltd.), may be used.

When the raw fluoropolymer has a hydrolyzable silyl group, for example, a silanol group (Si—OH group) is formed on the ejection surface S2 of the silicon nozzle substrate 11, and by hydrolytic condensation reaction of this silanol group and the hydrolyzable silyl group above, a strong siloxane bond (Si—O—OH group) is formed between the silicon nozzle substrate 11 and the liquid-repellent film 14. This improves the durability of the liquid-repellent film 14. The liquid-repellent film 14 thus formed has a fluoropolymer chain, for example, a perfluorinated polyether chain, extending from the bond ends with the silicon nozzle substrate 11 to the surface. Furthermore, it has liquid repellency by, for example, having a configuration with perfluoroalkyl groups on the topmost surface.

Further, by forming a base layer including a silicon compound on the ejection surface S2 of the silicon nozzle substrate 11 and forming a fluoropolymer layer on the base layer, a siloxane bond (Si—O—Si) may be formed between the base layer and the fluoropolymer. It is preferable that the base layer has a silicon oxide ($SiO_2$) layer at least on the fluoropolymer layer side. The base layer may be formed by known methods such as vapor deposition, sputtering, or CVD. The thickness of the base layer may be generally 10 to 100 nm.

To form a liquid-repellent film 14, for example, a fluoropolymer layer, on the ejection surface S2 of the silicon nozzle substrate 11, for example, a method of applying a raw fluoropolymer composition containing the raw material fluoropolymer (hereinafter referred to as "liquid-repellent agent") is applied to the ejection surface S2 and cured. Curing includes drying and reaction, for example, the hydrolytic condensation reaction described above. The liquid-repellent agent may contain only the raw fluoropolymer or may include a solvent. In addition, it may contain any solid components as required. The liquid-repellent agent may be applied by vapor deposition.

For example, when forming a liquid-repellent film 14, specifically a fluoropolymer layer, by vapor deposition on a laminate of a channel substrate 12 and a silicon nozzle substrate 11 bonded together from the ejection surface S2, the liquid-repellent agent that is the vapor deposition source is placed on the ejection surface S2 side, and the deposition is performed. By the deposition, the liquid-repellent agent adheres to the ejection surface S2 of the silicon nozzle substrate 11 and the inner wall (formation surface) of the nozzle 111. Further, it enters inside the channel substrate 12 from the nozzle 111 and adheres to the inner wall surface of the substrate body 12*a*. At that time, in the substrate body 12*a* of the channel substrate 12, the liquid-repellent agent does not adhere to the inner wall surface up to the position Y of the height of L×tan ϕ, but adheres to the inner wall surface above it.

When viewed the cross-sectional view shown in FIG. 7, the positional relationship between the inlet of the connecting portion 122*a* of the individual circulating channel 121*a* and the nozzle 111 satisfies Expression 1. That is, the inlet of the connecting portion 122*a* of the individual circulating channel 121*a* is entirely below the position Y at the height of L×tan ϕ. As a result, the liquid-repellent agent does not adhere to the formation surface F2 of the connecting portion 122*a* of the individual circulating channel 121*a* and the portion of the channel surface S1 corresponding to the lower surface of the connecting portion 122*a* in the substrate body 12*a*.

After the liquid-repellent is deposited, the liquid-repellent agent adhered to the above position of the laminate of the channel substrate 12 and the silicon nozzle substrate 11 is cured to form a liquid-repellent film. Since curing is usually performed by heating, during heating, the liquid-repellent agent enters the inner side of the channel substrate 12. The liquid-repellent agent adhering to the inner wall surface, specifically, the liquid-repellent agent adhering to the inner wall surface above the position Y of the height of L×tan ϕ is similarly cured to form a liquid-repellent film. The liquid-repellent film formed on the inner wall surface of the channel substrate 12 after curing may be selectively removed by treatment, for example, UV ozone irradiation, oxygen plasma irradiation.

In the UV ozone irradiation and oxygen plasma irradiation, the irradiation does not reach the portion overlapping the substrate body 12*a* viewed from the upper side of the channel substrate 12. Therefore, if the formation surface F2 of the connecting portion 122*a* of the individual circulation channel 121*a* and the portion of the channel surface S1 corresponding to the lower surface of the connecting portion 122*a* are formed with a liquid-repellent film, it is almost not possible to remove the liquid-repellent film by this method. In the cross-section shown in FIG. 7, as described above, a liquid-repellent film is not formed on the formation surface F2 of the connecting portion 122*a* of the individual circulation channel 121*a* and the portion of the channel surface S1 corresponding to the lower surface of the connecting portion 122*a*. Therefore, substantially all of the liquid-repellent film formed on the inner wall surface of the channel substrate 12 may be removed by UV ozone irradiation or oxygen plasma irradiation from above the channel substrate 12. In addition, this method also makes it possible to remove the liquid-repellent film formed on the surface on which the nozzles 111 are formed.

In this way, as shown in the cross-section of FIG. 7, the laminate 10A in which the liquid-repellent film 14 is formed only on the ejection surface S2 of the silicon nozzle substrate 11 is obtained. The liquid-repellent film 14 is not necessarily formed on the entire surface of the ejection surface S2 as long as it is formed at least around the nozzle 111, but is preferably formed on the entire surface.

As described above and shown in FIG. 7, it has been described that the cross-section obtained by cutting the laminate 10A along a plane orthogonal to the channel surface S1 of the silicon nozzle substrate 11 so as to include the center 111C of the nozzle 111 and the individual circulation channel 121*a* satisfies the Expression 1. In the laminate 10A, a cross-section cut along a plane orthogonal to the channel surface S1 of the silicon nozzle substrate 11 so as to include the center 111C of the nozzle 111 and the individual circulation channel 121*b*, that is, the cross-section of the laminate 10A cut along line B-B shown in FIG. 6 also satisfies Expression 1. Furthermore, a cross-section cut along a plane orthogonal to the channel surface S1 of the silicon nozzle substrate 11 so as to include the center 111C of the nozzle 111 and the individual circulation channel 121*c*, that is, the cross-section of the laminate 10A cut along line C-C shown in FIG. 6 also satisfies Expression 1.

In this way, all of the three individual circulation channels 121*a*, 121*b*, and 121*c* of the laminate 10A satisfy the positional relationship with the nozzle 111 in Expression 1. As a result, in the laminate 10A, when the liquid-repellent film 14 is formed on the ejection surface S2, the liquid-repellent film is not formed on the inner wall surface of the channel substrate 12 where it is difficult to remove. The liquid-repellent film formed on the inner wall surface of the channel substrate 12 may be removed efficiently.

Next, application of Expression 1 in a case where the cross-section of the nozzle 111 in the silicon nozzle substrate 11 has a shape that decreases stepwise from the channel surface S1 toward the ejection surface S2 will be described with reference to FIG. 9A and FIG. 9B.

A laminate 10B whose-cross section is shown in FIG. 9A and a laminate 10C whose cross-section is shown in FIG. 9B are laminates in which the enlarged plan view of the vicinity of the nozzle 111 seen from the channel substrate 12 side is substantially the same as the laminate 10A. Specifically, the laminate 10A, the laminate 10B, and the laminate 10C are laminates having the same plan view except that the diameters of the nozzles 111 on the channel surface S1 are different from each other. The laminate 10B and the laminate 10C are configured such that the diameter of the nozzle 111 of the silicon nozzle substrate 11 in a plan view decreases stepwise from the channel surface S1 toward the ejection surface S2.

In each of the laminate 10B and the laminate 10C, the number of stages constituting the nozzle 111 is two, however, the number of stages may be selected as appropriate. In addition, the cross-sectional shape of the nozzle 111 in each stage is not particularly limited as long as it is formed so as to satisfy Expression 1. For example, there may be a configuration in which there is no change in the diameter in each stage, and the diameter becomes smaller in the lower stage from the channel surface Sb toward the ejection surface S2, and the cross-section may have a step-like shape.

The cross-sectional view of the laminate 10B shown in FIG. 9A is a cross-sectional view cut along a plane orthogonal to the channel surface S1 of the silicon nozzle substrate 11 so as to include the center 111C of the nozzle 111 and the individual circulating channel 121*a*. The laminate 10B shown in FIG. 9A is different from the laminate 10A in that the cross-section of the nozzle 111 of the silicon nozzle substrate 11 decreases in two stages from the channel surface S1 toward the ejection surface S2. The nozzle 111 in the laminate 10B has a larger opening diameter in the channel surface S1 than the nozzle 111 in the laminate 10A. The diameter is greatly reduced in the first stage from the channel surface S1 toward the ejection surface S2, and the diameter is not greatly reduced in the second stage.

In the case of the configuration in which the diameter of the nozzle 111 included in the silicon nozzle substrate 11 in a plan view decreases stepwise from the channel surface S1 toward the ejection surface S2 as described above, as ϕ in Expression 1, the maximum angle is used among the angles formed by the straight line connecting the nozzle end A (the nozzle end on the side far from the individual circulation channel 121*a* located on the ejection surface S2) and an end of each stage on the channel surface S1 side and closer to the individual circulation channel 121*a*, and the ejection surface S2.

In the laminate 10B, in the first stage from the channel surface S1 toward the ejection surface S2, the end portion on the channel surface S1 side and closer to the individual circulation channel 121*a* is indicated by B2 in FIG. 9A. In addition, in the second stage from the channel surface S1 toward the ejection surface S2, the end portion on the channel surface S1 side and closer to the individual circulation channel 121*a* is indicated by B1 in FIG. 9A. Comparing the angle formed by the straight line connecting the nozzle end A and the nozzle end B2 and the ejection surface S2 and the angle formed by the straight line connecting the nozzle end A and the nozzle end B1 and the ejection surface S2, the angle formed by the straight line connecting the nozzle end A and the nozzle end B1 and the ejection surface S2 is larger, therefore, this angle is defined as $\phi$ in Expression 1.

In addition, the laminate 10B shown in FIG. 9A is different from the laminate 10A in that, as for the channel substrate 12, the connecting portion 122*a* of the individual circulation channel 121*a* has both upper and lower surfaces formed with the formation surface F2 of the substrate main body 12*a*. Therefore, in the laminate 10B, there are two intersections of the formation surface F1 of the through channel 125 and the formation surface F2 of the connecting portion 122*a*. The intersection X related to L used in Expression 1 is an intersection farthest from the channel surface S1 among these intersections, that is, an intersection farthest from the channel surface S1 at the inlet of the connecting portion 122*a*.

In FIG. 9A, the length of $L \times \tan\phi$ and the length of H1 are shown side by side with a dashed double-headed arrow. In FIG. 9A, Y indicates the position of the height of $L \times \tan\phi$ on the formation surface F1 of the through channel 125. As shown in FIG. 9A, in the laminate 10B as well as in the laminate 10A, it can be seen that the positional relationship between the individual circulation channel 121*a*, more specifically, the inlet of the connecting portion 122*a* of the individual circulation channel 121*a* and the nozzle 111 satisfies Expression 1. That is, in FIG. 9A, the position Y at the height of $L \times \tan\phi$ on the formation surface F1 of the through channel 125 is located above the intersection X farthest from the channel surface S1 among the intersections of the formation surface F1 of the through channel 125 and the formation surface of the individual circulation channel 121*a* in the substrate body 12*a*.

Furthermore, in the laminate 10B, in a cross-section cut along a plane orthogonal to the channel surface S1 of the silicon nozzle substrate 11 so as to include the center 111C of the nozzle 111 and the individual circulation channels 121*b*, and also in a cross-section cut along a plane orthogonal to the channel surface S1 of the silicon nozzle substrate 11 so as to include the center 111C of the nozzle 111 and the individual circulation channels 121*c*, Expression 1 is satisfied.

In this way, the positional relationship with the nozzle 111 in all of the three individual circulating channels 121*a*, 121*b*, and 121*c* of the laminate 10B satisfies Expression 1. As a result, when the liquid-repellent film 14 is formed on the ejection surface S2 of the laminate 10B, the liquid-repellent film is not formed on the inner wall surface of the channel substrate 12 where it is difficult to remove, and the liquid-repellent film formed on the inner wall surface of the channel substrate 12 may be efficiently removed in subsequent processing.

A cross-sectional view of the laminate 10C shown in FIG. 9B is a cross-section cut along a plane orthogonal to the channel surface S1 of the silicon nozzle substrate 11 so as to include the center 111C of the nozzle 111 and the individual circulation channels 121*a*.

The laminate 10C shown in FIG. 9B is different from the laminate 10A in that the cross-section of the nozzle 111 decreases in two stages from the channel surface S1 toward the ejection surface S2 for the silicon nozzle substrate 11. The nozzle 111 in the laminate 10C has a larger diameter of the opening on the channel surface S1 than the nozzle 111 in the laminate 10A, and the diameter is reduced at the first stage from the channel surface S1 toward the ejection surface S2. There is no reduction in diameter in the second stage. Compared to the laminate 10B, the laminate 10C has a smaller diameter of the openings on the channel surface S1 than the nozzles 111 of the laminate 10B, and the decrease rate of the diameter in the first stage is small.

In the laminate 10C, in the first stage from the channel surface S1 toward the ejection surface S2, the end portion on the channel surface S1 side and closer to the individual circulation channel 121*a* is indicated by B2 in FIG. 9B. In addition, in the second stage from the channel surface S1 toward the ejection surface S2, the end portion on the side of the channel surface S1 and closer to the individual circulation channel 121*a* is indicated by B1 in FIG. 9B. Comparing the angle formed by the straight line connecting the nozzle end A and the nozzle end B2 and the ejection surface S2 and the angle formed by the straight line connecting the nozzle end A and the nozzle end B1 and the ejection surface S2, the angle formed by the straight line connecting the nozzle A and the nozzle end B2 and the ejection surface S2 is larger, therefore this angle is defined as $\phi$ in Expression 1.

The laminate 10C shown in FIG. 9B is different from the laminate 10A in that, regarding the channel substrate 12, the connecting portion 122*a* of the individual circulation channel 121*a* has both upper and lower surfaces formed by the formation surface F2 of the substrate body 12*a*, and is not parallel to the channel surface S1 but rises toward the extension portion 123*a*. Therefore, in the laminate 10C, there are two intersections of the formation surface F1 of the through channel 125 and the formation surface F2 of the connecting portion 122*a*. The intersection X related to L used in Expression 1 is the farthest intersection from the channel surface S1 among these intersections, that is, the farthest intersection from the channel surface S1 at the inlet of the connecting portion 122*a*.

In FIG. 9B, the length of $L \times \tan\phi$ and the length of H1 are shown side by side with a dashed double-headed arrow. In FIG. 9B, Y indicates the position of the height of $L \times \tan\phi$ on the formation surface F1 of the through channel 125. As shown in FIG. 9B, in the laminate 10C as well as in the laminate 10A, it can be seen that the positional relationship between the individual circulation channel 121*a*, more specifically, the inlet of the connecting portion 122*a* of the individual circulation channel 121*a* and the nozzle 111 satisfies Expression 1. That is, in FIG. 9B, the position Y of the height of $L \times \tan\phi$ on the formation surface F1 of the through channel 125 is located above the intersection X farthest from the channel surface S1 among the intersections of the formation surface F1 of the through channel 125 and the formation surface of the individual circulation channel 121*a* in the substrate body 12*a*.

Furthermore, in the laminate 10C, in a cross-section cut along a plane orthogonal to the channel surface S1 of the silicon nozzle substrate 11 so as to include the center 111*c* of the nozzle 111 and the individual circulating channel 121*b*, and also in a cross-section cut along a plane orthogonal to the channel surface S1 of the silicon nozzle substrate 11 so as to include the center 121*c* of the nozzle 111 and the individual circulating channel 121*c*, Expression 1 is satisfied.

In this way, the positional relationship with the nozzles 111 in all of the three individual circulation channels 121*a*, 121*b*, and 121*c* of the laminate 10C satisfies Expression 1. As a result, in the laminate 10C, when the liquid-repellent film 14 is formed on the ejection surface S2, the liquid-repellent film is not formed on a portion of the inner wall surface of the channel substrate 12 that is difficult to remove. The liquid-repellent film formed on the inner wall surface of the channel substrate 12 may be removed efficiently.

Next, with reference to FIG. 10 and FIG. 11, description will be given of application of Expression 2 to a laminate in which centers of the nozzle 111 and the through channel 125 coincide with each other in a plan view seen from the upper surface S4 side of the channel substrate 12, and the two individual circulating channels 121 are in a symmetrical relationship in a cross-section cut along a plane orthogonal to the channel surface S1 of the silicon nozzle substrate 11 so as to include two of the center of the nozzle 111 and the through-channel 125 and individual circulating channels 121.

Figure 10:
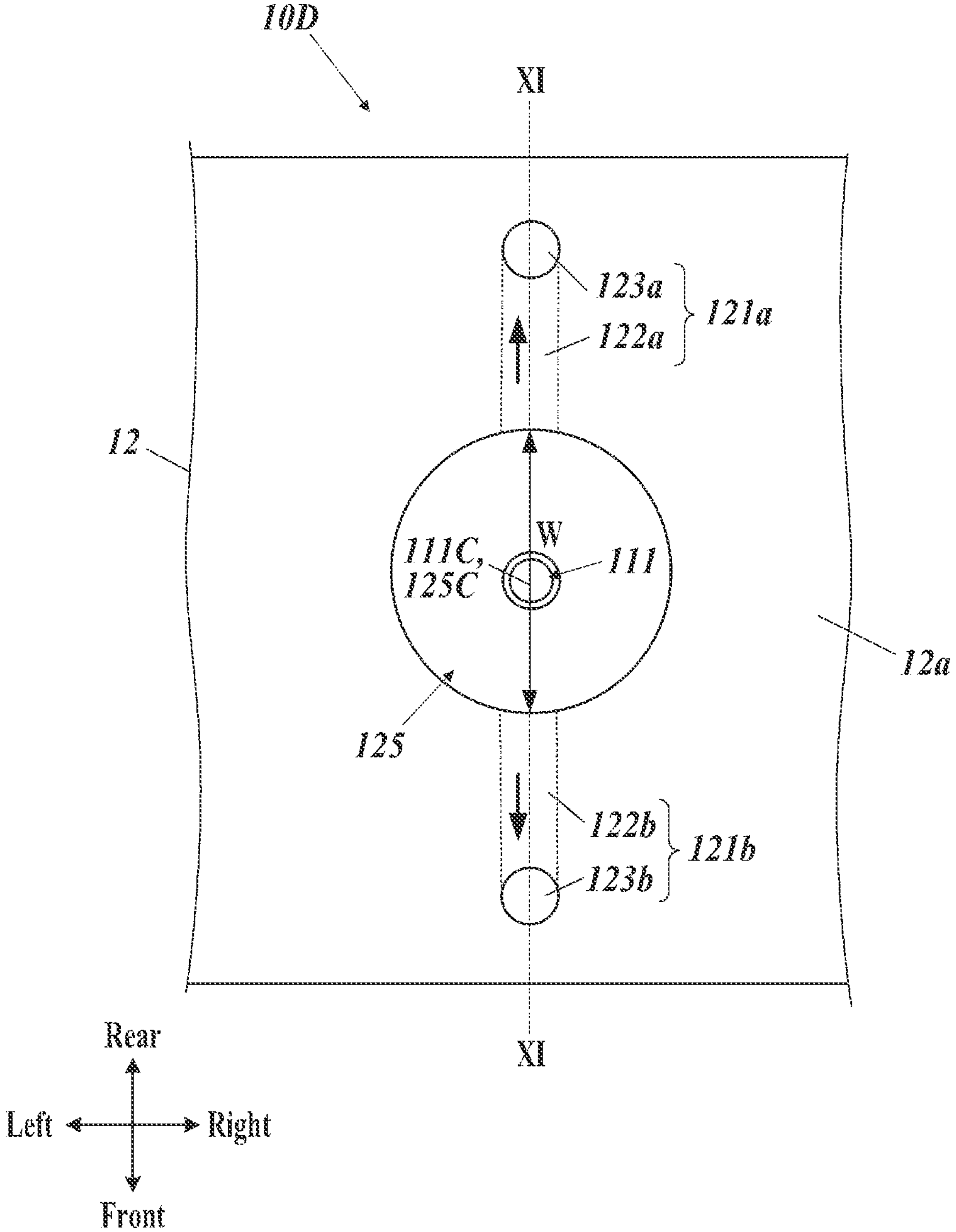
FIG. 10 This is an enlarged plan view of the vicinity of the nozzle, viewed from the channel substrate side, of a modification of the laminate of the liquid-repellent film, the silicon nozzle substrate, and the channel substrate.

FIG. 10 is an enlarged plan view of the vicinity of the nozzle 111 of a laminate 10D which is an example of the laminate of the channel substrate 12, the silicon nozzle substrate 11, and the liquid-repellent film 14, viewed from the channel substrate 12 side in the inkjet head 100 shown in FIG. 2. It is a cross-sectional view of the laminate 10D shown in FIG. 10 cut along line XI-XI.

As shown in FIG. 10, the laminate 10D has two individual circulating channels 121*a* and 121*b*, and these individual circulating channels 121*a* and 121*b* are located on a straight line passing through the center of the nozzle 111 on the channel surface S1, and the center 111C of the nozzle 111 and the center 125C of the through channel 125 coincide with each other in a plan view seen from the upper surface S4 side of the channel substrate 12. The silicon nozzle substrate 11 and the liquid-repellent film 14 in the laminae 10D have the same configuration as that of the laminate 10A.

The channel substrate 12 of the laminate 10D has two individual circulating channels 122*a* and 122*b* respectively having connecting portions 121*a* and 121*b* extending back and forth around the through channel 125. The cross-section of the laminate 10D cut along the line XI-XI shown in FIG. 11 is a cross-section cut along a plane orthogonal to the channel surface S1 of the silicon nozzle substrate 11 so as to include the centers of the nozzle 111 and the through channel 125 and the two individual circulating channels 121*a* and 121*b*. In the cross-section shown in FIG. 11, the two individual circulating channels 121*a* and 121*b* are symmetrical with respect to the through channel 125.

The individual circulating channel 121*a* in the channel substrate 12 of the laminate 10D has the same configuration as that of the individual circulating channel 121*a* in the channel substrate 12 of the laminate 10A, and includes a connecting portion 122*a* communicating with the through channel 125 and extending in a direction away from the nozzle 111, and an extension portion 123*a* extending upward from the farthest end of the connecting portion 122*a* from the nozzle 111 and reaching the upper surface S4 of the substrate body 12*a*. Similarly, the individual circulating channel 121*b* in a symmetrical relationship with the individual circulating channel 121*a* is also composed of a connecting portion 122*b* communicating with the through channel 125 and an extension portion 123*b* extending upward from the connecting portion 122*b* and reaching a position of the upper surface S4 of the substrate body 12*a*.

Figure 11:
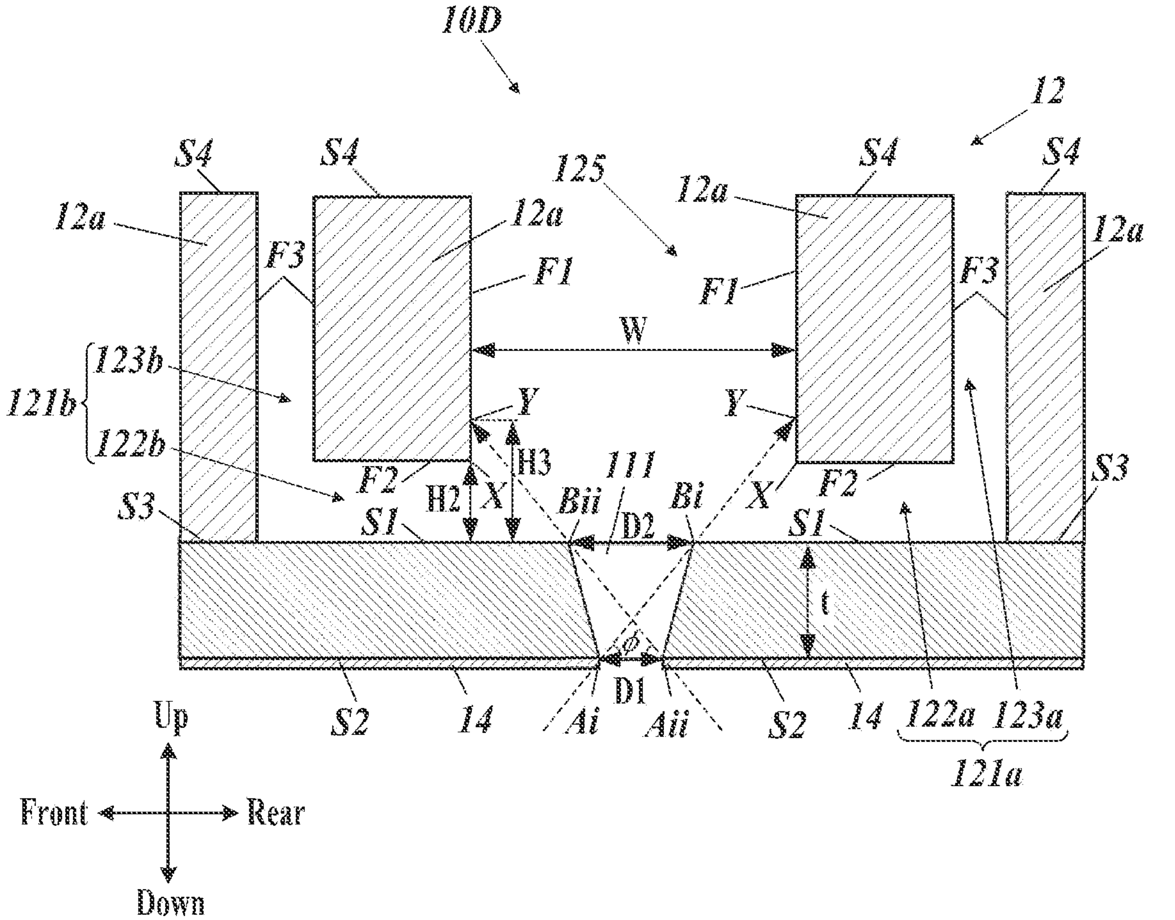
FIG. 11 This is a cross-sectional view of the laminate shown in FIG. 10 cut along XI-XI.

In the laminate 10D according to the present invention, in the cross-section shown in FIG. 11, the positional relationship between each of the individual circulating channels 121*a* and 121*b* and the nozzle 111 satisfies Expression 1. To describe Expression 1 regarding the positional relationship between the individual circulating channel 121*a* and the nozzle 111, the nozzle end portion located on the ejection surface S2 on the side far from the individual circulating channel 121*a* is denoted by Ai, and the nozzle end portion located on the channel surface S1 on the side close to the individual circulating channel 121*a* is denoted by Bi. An angle formed by a straight line connecting the nozzle end portion Ai and the nozzle end portion Bi and the ejection surface S2 is defined as ϕ, and L×tan ϕ is obtained in the same manner as in the case of the laminate 10A.

On the other hand, regarding the positional relationship between the individual circulating channel 121*b* and the nozzle 111, Expression 1 will be described. The nozzle end portion on the side far from the individual circulating channel 121*b* is denoted by Aii, and a nozzle end portion located on the channel surface S1 and closer to the individual circulating channel 121*a* is denoted by Bii. An angle formed by a straight line connecting the nozzle end portion Aii and the nozzle end portion Bii and the ejection surface S2 is denoted by ϕ, and L×tan ϕ is obtained in the same manner as in the case of the laminate 10A. The individual circulating channel 121*a* and the individual circulating channel 121*b* have the above-described symmetrical positional relationship, and the angles θ and L×tan ϕ indicate the same value.

In FIG. 11, the position at the height of L×tan ϕ on the formation surface F1 of the through channel 125 is indicated by Y. In FIG. 11, the description of L is omitted, and the distance from the channel surface S1 of the silicon nozzle substrate 11 to the position Y at the height of L×tan ϕ is indicated by H3.

As shown in FIG. 11, also in the laminate 10D, similarly to the laminate 10A, it can be seen that the positional relationship between the individual circulating channels 121*a* and 121*b*, to be specific, the inlets of the connecting portions 122*a* and 122*b* of the individual circulating channels 121*b* and 122*a*, and the nozzle 111 satisfies Expression 1. That is, in FIG. 11, the position Y at a height of L×tan ϕ on the formation surface of the through channel 125 on the side of the individual circulating channel 121*a* is located above an intersection X between the formation surface F1 of the through channel 125 and the formation surface F2 of the individual circulating channel 121*a* in the substrate body 12*a*. Similarly, the position Y at the height of L×tan ϕ on the formation surface F1 side of the individual circulation channel 121*b* of the through channel 125 is located above the intersection X of the formation surface F1 of the through channel 125 and the formation surface F2 of the individual circulation channel 121*b* in the substrate body 12*a*.

In the laminate 10D, the positional relationship between the individual circulating channels 121*a* and 121*b*, the through channel 125, and the nozzle 111 satisfies the following Expression 2.

$$(W-D2)/(D1+D2)\times t>H2 \qquad \text{Expression 2:}$$

Each symbol in Expression 2 has the following meaning in a cross-section cut along a plane orthogonal to the channel surface 121*a* of the silicon nozzle substrate 11 so as to include the centers of the nozzle 111 and the through channel

125 and the two individual circulating channels 121*a* and 121*b*, that is, in a cross-section shown in FIG. 11. Equation 2 will be described below with reference to the cross-sectional view shown in FIG. 11.

D1 is the diameter of the nozzle 111 on the ejection surface S2 of the silicon nozzle substrate 11, D2 is the diameter of the nozzle 111 on the channel surface S1 of the silicon nozzle substrate 11, and t is the thickness of the silicon nozzle substrate 11. D1, D2, and t in the silicon nozzle substrate 11 are preferably in the same ranges as described for the laminate 10A.

W is the width of the through channel 125. In FIG. 11, W is the distance between the formation surface F1 of the through channel 125 on the side communicating with the individual circulation channel 121*a* and the formation surface F1 of the through channel 125 on the side communicating with the individual circulation channel 121*b*.

H2 is a distance from a channel surface S1 of the silicon nozzle substrate 11 to an intersection X farthest from the channel surface S1 among intersections of a formation surface F1 of the through channel 125 and a formation surface F2 of the individual circulating channels 121*a* and 121*b* in the substrate body 12*a*.

(W−D2)/(D1+D2)×t in Expression 2 corresponds to a distance H3 from the channel surface S1 of the silicon nozzle substrate 11 to a position Y at a height of L×tan ϕ as shown in the following Expression 3. Furthermore, H3 may also be obtained by the following Expression 4 using 4.

$$(W-D2)/(D1+D2)\times t=H3 \qquad \text{Expression 3:}$$

$$H3=(W-D2)/(2\times\tan\phi) \qquad \text{Expression 4:}$$

In FIG. 11, in the vicinity of the inlet of the individual circulating channel 121*b*, H3 and H2 are shown side by side by a double-headed arrow of a broken line. As shown in FIG. 11, in the laminate 10D, the positional relationship between the individual circulating channels 121*a* and 121*b*, the through channel 125, and the nozzle 111 is H3>H2, and it is understood that Expression 2 is satisfied. In this way, in the laminate 10D, satisfying Expression 1 and satisfying Expression 2 have the same meaning. In the laminate 10D, the positional relationship between the individual circulation channels 121*a* and 121*b*, the through channel 125, and the nozzle 111 satisfies Equations 1 and 2. As a result, when forming the liquid-repellent film 14 on the ejection surface S2, the liquid-repellent film is not formed on a portion of the inner wall surface of the channel substrate 12 that is difficult to remove. The liquid-repellent film formed on the inner wall surface of the channel substrate 12 may be efficiently removed by subsequent processing.

Next, as a modified example of the head chip 1 included in the inkjet head 100 according to the present embodiment, an example in which the number of rows of the nozzles 111 is four will be described with reference to FIG. 12 to FIG. 18B. As described above, the number of rows and the arrangement of the nozzles 111 may be appropriately changed, and for example, the number of rows may be one as described above, may be any of two to three rows, and may be five or more.

Figure 12:
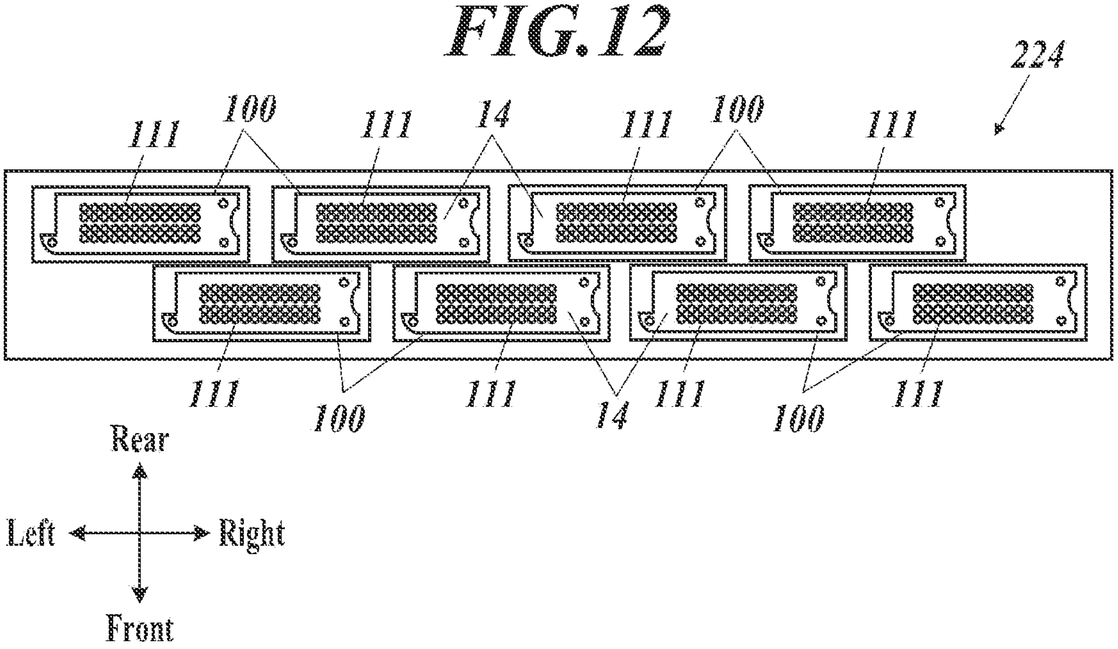
FIG. 12 This is a bottom view of another example of the head unit of the inkjet recording apparatus shown in FIG. 1.

FIG. 12 is a bottom view of an example of the head unit 224 of the inkjet recording apparatus 200 shown in FIG. 1, which is different from the head unit shown in FIG. 2. In the head unit 224 shown in FIG. 12, the number of rows of the nozzles 111 in the inkjet head 100 is four while the number of rows of the nozzles 111 in the inkjet head 100 shown in FIG. 2 is one. A perspective view of the inkjet head 100 in which the number of rows of the nozzles 111 is four and a cross-sectional view of a lower portion of the inkjet head 100 in the left-right direction are the same as those shown in FIG. 3 and FIG. 4.

Figure 14A:
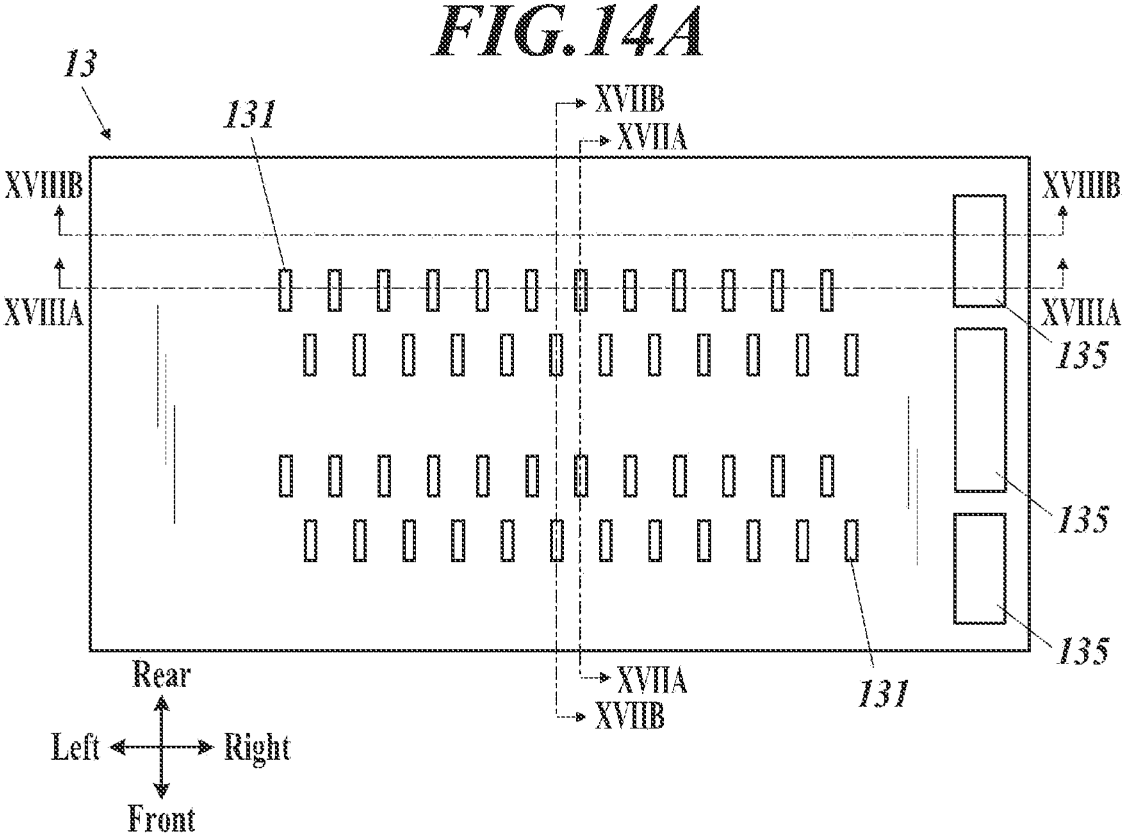
FIG. 14A This is a plan view of the pressure chamber substrate of the head chip shown in FIG. 13.
Figure 14B:
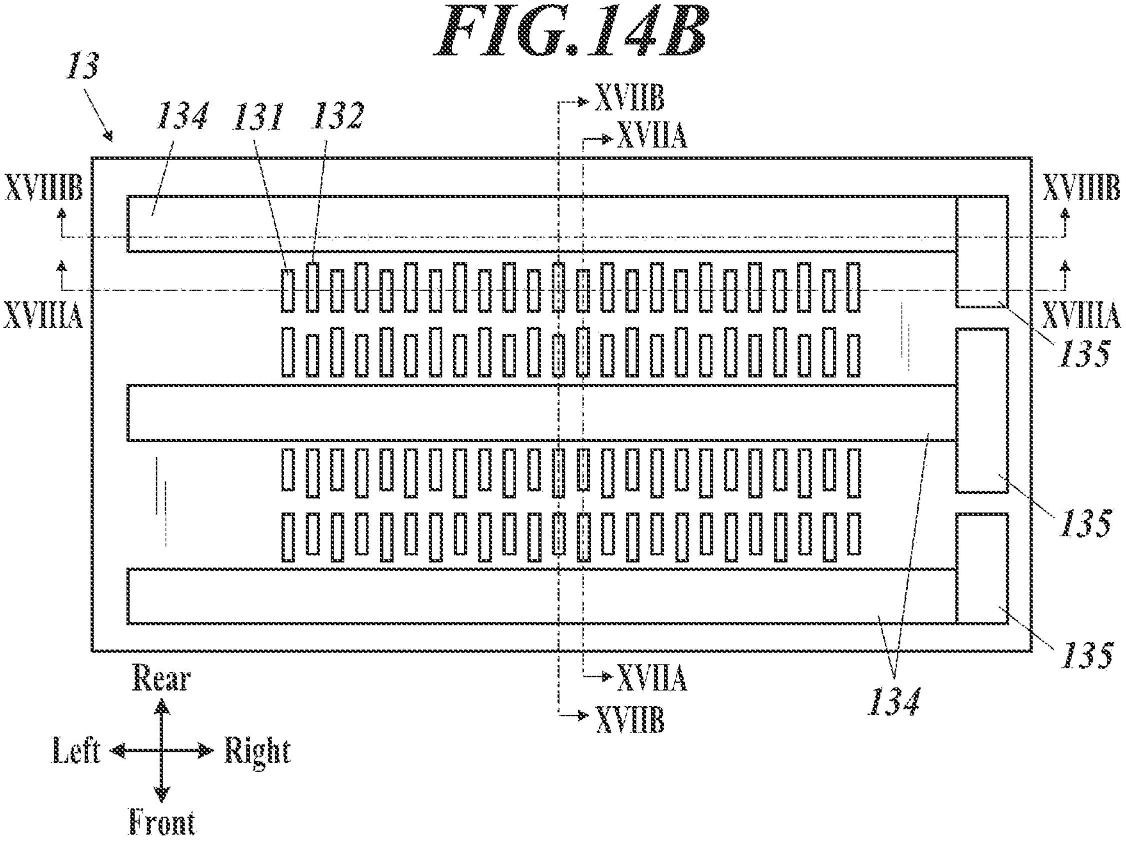
FIG. 14B This is a bottom view of the pressure chamber substrate of the head chip shown in FIG. 13.
Figure 15A:
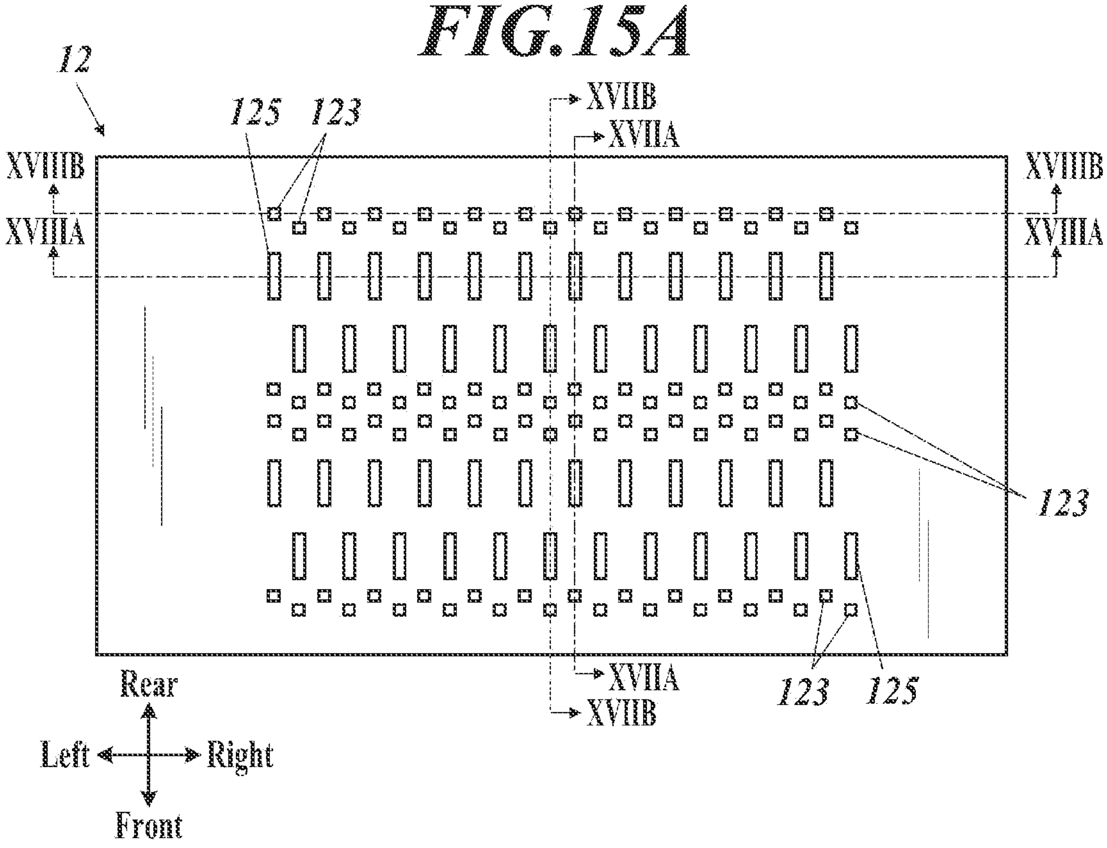
FIG. 15A This is a plan view of the channel substrate of the head chip shown in FIG. 13.
Figure 15B:
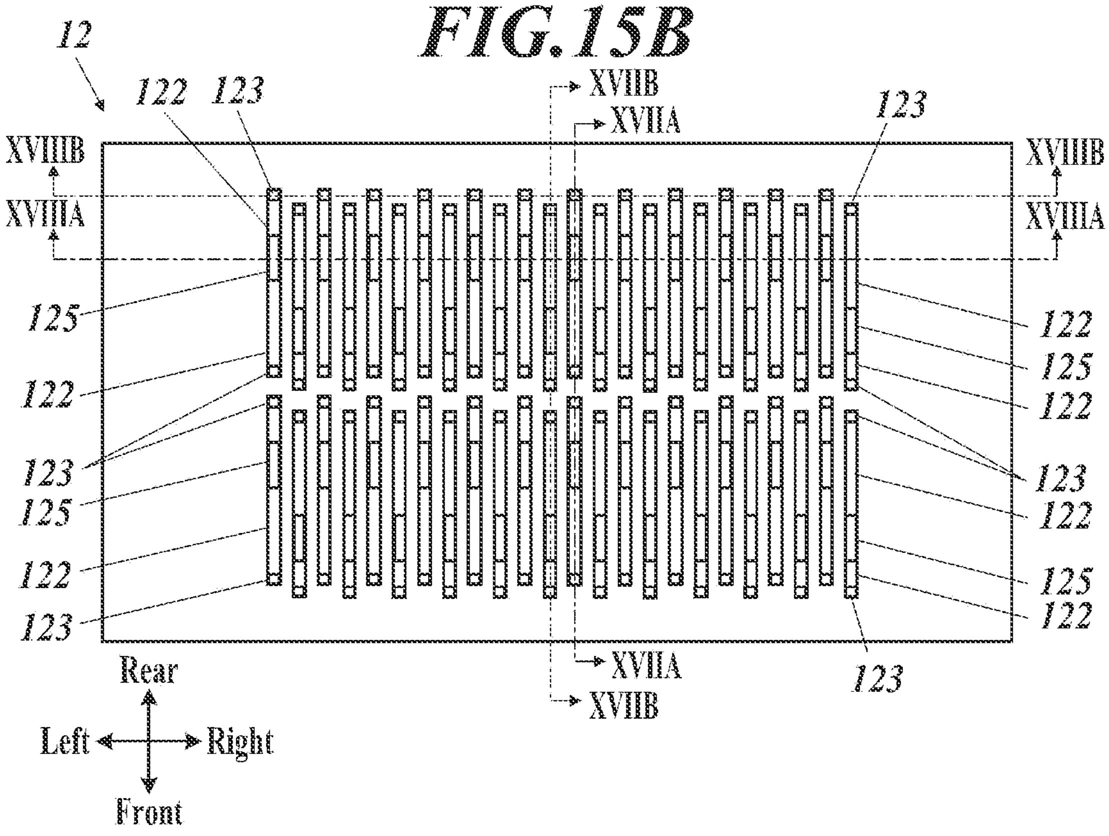
FIG. 15B This is a bottom view of the channel substrate of the head chip shown in FIG. 13.
Figure 16:
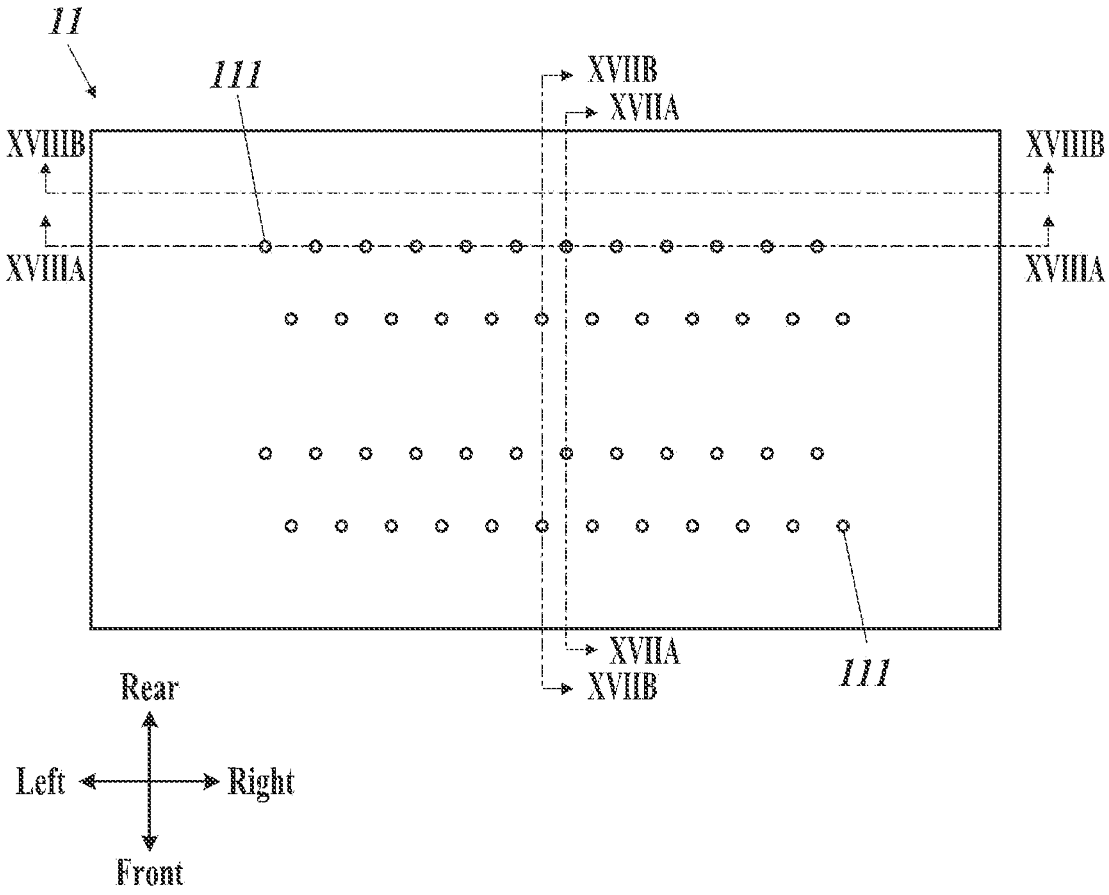
FIG. 16 This is a plan view of the silicon nozzle substrate of the head chip shown in FIG. 13.

FIG. 13 is an exploded perspective view of the head chip 1 constituting the inkjet head 100 of the head unit 224 shown in FIG. 12. FIG. 14A and FIG. 14B are a plan view and a bottom view, respectively, of the pressure chamber substrate 13 of the head chip 1 shown in FIG. 13. The FIG. 15A and FIG. 15B are a plan view and a bottom view, respectively, of the channel substrate 12 of the head chip 1 shown in FIG. 13. FIG. 16 is a plan view of silicon nozzle substrate 11 of head chip 1 shown in FIG. 13. FIG. 17A to FIG. 18B are cross-sectional views of the head chip 1 shown in FIG. 13 cut along lines XVIIA-XVIIA, XVIIB-XVIIB, XVIIIA-XVIIIA, and XVIIIB-XVIIIB, respectively.

The head chip 1 is a member having a substantially quadrangular prism shape elongated in the left-right direction, and is configured by stacking a pressure chamber substrate 13, a channel substrate 12, a silicon nozzle substrate 11, and a liquid-repellent film 14 in this order (FIG. 13 to FIG. 18B). In FIG. 13, the silicon nozzle substrate 11 and the liquid-repellent film 14 are shown without being decomposed.

The head chip 1 shown in FIG. 13 is a head chip having a shear-mode type pressure mechanism. The pressure chamber substrate 13 is provided with a supply channel 131, an air chamber 132, and a common circulating channel 133 (see FIG. 13, FIG. 14A, and FIG. 14B). The supply channel 131 and the air chamber 132 are provided in large numbers so as to be alternately arranged in the left-right direction, and are provided in four rows in the front-rear direction. The supply channel 131 has a substantially rectangular cross section, is formed along the up-down direction, has an inlet on the upper surface of the pressure chamber substrate 13, and has an outlet on the lower surface.

In addition, the supply channel 131 communicates with the ink reservoir 51 of the manifold 5 at an end portion in the upper direction, an ink is supplied to the supply channel 131 from the ink reservoir 51, and the ink to be ejected from the nozzle 111 is stored in the supply channel 131. The supply channel 131 of the pressure chamber substrate 13 and the through channel 125 of the channel substrate 12 constitute a pressure chamber in a shear-mode type pressure mechanism. In the head chip 1 shown in FIG. 13, the pressure chamber is configured along the up-down direction so as to have a substantially rectangular cross-section of the same area across the supply channel 131 of the pressure-chamber substrate 13 and the through channel 125 of the channel substrate 12, and communicates with the nozzle 111 at an end portion in the lower direction (see FIG. 17A and FIG. 17B).

The air chamber 132 has a substantially rectangular cross-section slightly larger than the supply channel 131, and is formed so as to be parallel to the supply channel 131 along the up-down direction. Unlike the supply channel 131, the air chamber 132 does not communicate with the ink reservoir 51, and the ink does not flow into the air chamber 132 (see FIG. 17A and FIG. 17B).

Figure 17A:
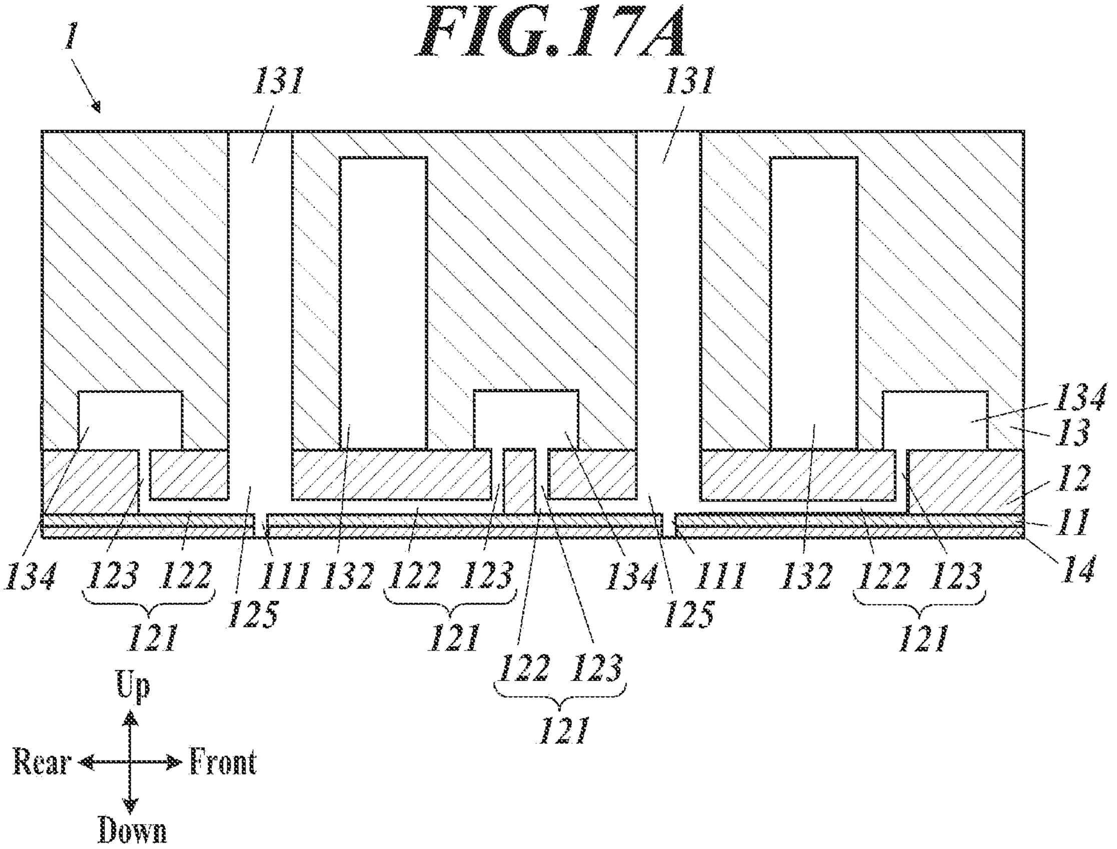
FIG. 17A This is a cross-sectional view of the head chip shown in FIG. 13 cut along XVIIA-XVIIA.
Figure 17B:
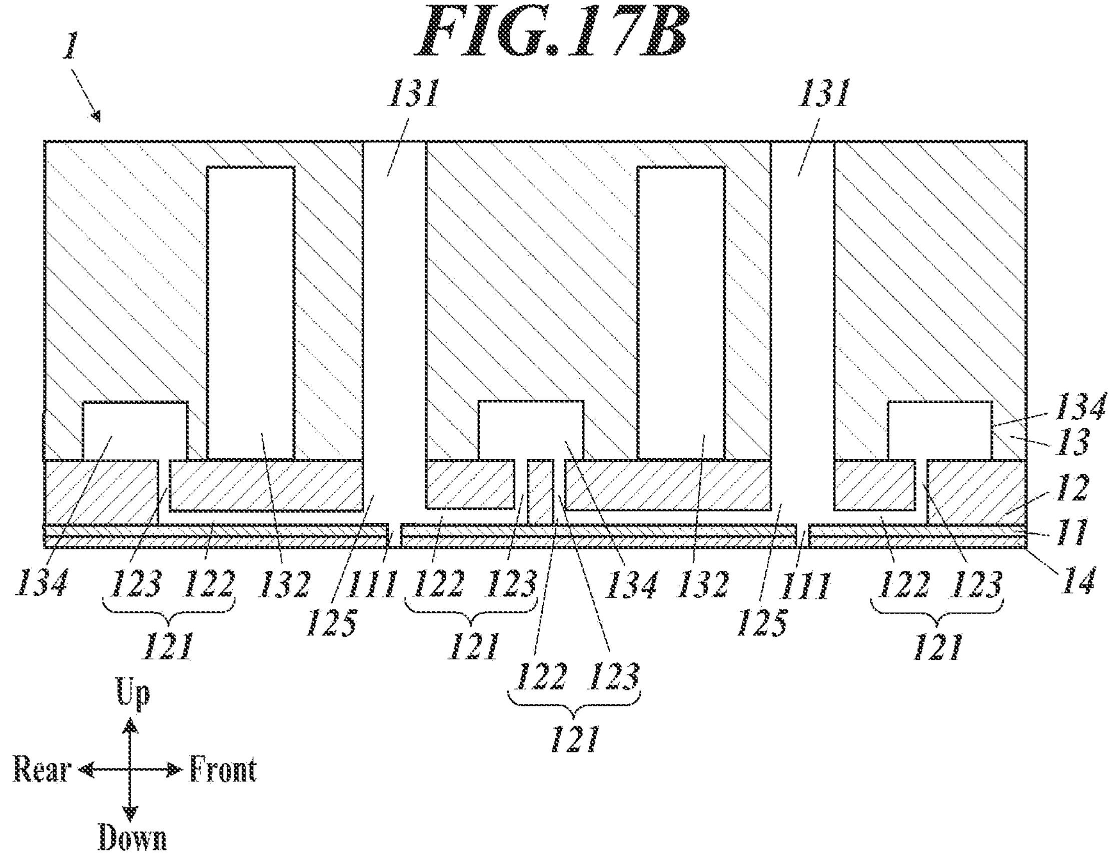
FIG. 17B This is a cross-sectional view of the head chip shown in FIG. 13 cut along XVIIB-XVIIB.
Figure 18A:
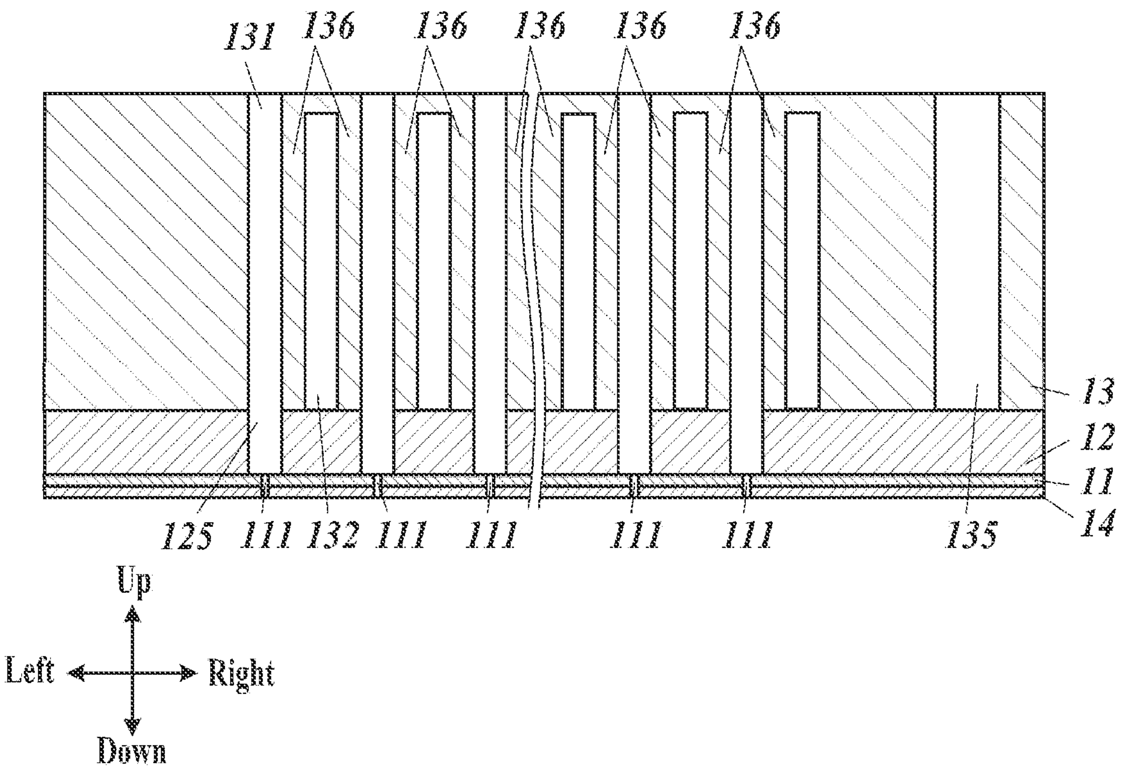
FIG. 18A This is a cross-sectional view of the head chip shown in FIG. 13 cut along line XVIIIA-XVIIIA.
Figure 18B:
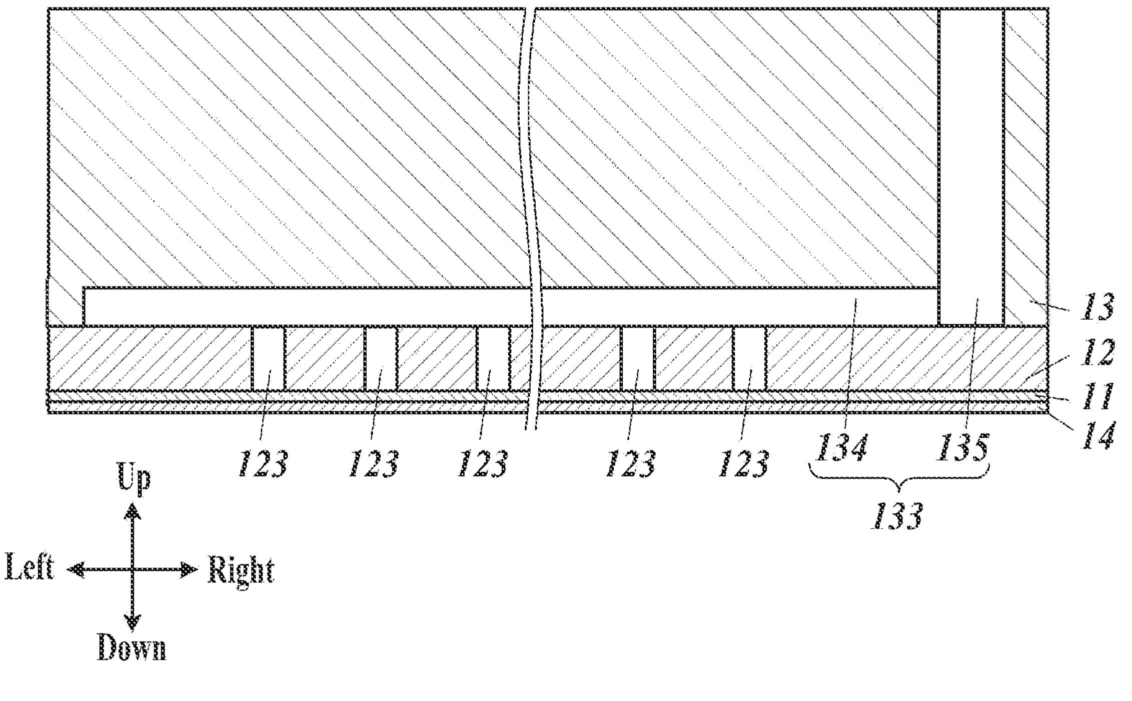
FIG. 18B This is a cross-sectional view of the head chip shown in FIG. 13 cut along XVIIIB-XVIIIB.

The supply channel 131 and the air chamber 132 are formed to be separated from each other by a partition wall 136 as a pressure-generating unit formed of a piezoelectric material (see FIG. 18A). The partition wall 136 is provided with drive electrodes (not shown), and when a voltage is applied to the drive electrodes, a portion of the partition wall 136 between the adjacent supply channel 131 repeats shear-mode type displacement, whereby a pressure is applied to the ink in the supply channel 131. In the supply channel 131 shown in FIG. 13 to FIG. 18B, the supply channel 131 located at the end portion in the left-right direction having the partition wall 136 only on one side is not used, and the other supply channel 131 having the partition wall 136 on both sides is used.

It should be noted that only the supply channel 131 may be formed without providing the air chamber 132. However, as described above, it is preferable that the supply channel 131 and the air chamber 132 are alternately provided so that the supply channels 131 are not adjacent to each other. As a result, the supply channels 131 may be prevented from adjoining each other, so that when the partition wall 136 adjacent to one supply channel 131 is deformed, the other supply channels 131 are not affected.

The common circulating channel 133 is formed by connecting a first common circulating channel 134 and a second common circulating channel 135 (see FIG. 13 and FIG. 14B). The first common circulating channels 134 is provided on the lower surface side of the pressure chamber substrate 13 along the left-right direction in three rows on the front side, the rear side, and the central portion of the head chip 1 so as to avoid the portions where the supply channels 131 and the air chambers 132 are provided.

In addition, a plurality of individual circulating channels 121 provided in the channel substrate 12 are connected to the lower surface side of the first common circulating channel 134. The individual circulating channel 121 includes a connecting portion 122 communicating with the through channel 125 and an extension portion 123 extending from the connecting portion 122, and the ink is discharged from the through channel 125 of the channel substrate 12 through the connecting portion 122 from the extension portion 123, and may join in the first common circulating channel 134 (FIG. 14B, FIG. 15A, FIG. 17A, and FIG. 17B). In addition, the first common circulating channel 134 is connected to the second common circulating channel 135 capable of discharging the ink to the outside of the head chip 1 in the vicinity of the right end portion. Therefore, the first common circulating channel 134 is a channel through which the ink flowing from the extension portion 123 of the individual circulating channel 121 flows toward the second common circulating channel 135.

The second common circulation channel 135 is formed along the up-down direction similarly to the supply channel 131. In addition, the second common circulation channel 135 communicates with the first common circulation channel 134 on the lower surface side of the pressure chamber substrate 13, and communicates with the discharge liquid chamber 57 of the manifold 5 on the upper surface side, and is a flow path for discharging the ink flowing from the first common circulation channel 134 toward the upper side (the side opposite to the silicon nozzle substrate 11 side) to the outside of the head chip 1. The second common circulation channel 135 is provided in the vicinity of the right end portion of the head chip 1 and communicates with the first common circulation channel 134, and the second common circulation channel 135 is provided so as to have a larger volume than the individual supply channel 131, and thus it is possible to increase the discharge efficiency of the ink.

In the channel substrate 12, a through channel 125 which communicates with the supply channel 131 of the pressure chamber substrate 13 and is formed along the up-down direction so as to have a substantially rectangular cross-section having the same area as that of the supply channel 131, and an individual circulation channel 121 which is provided so as to branch from the through channel 125 are formed (see FIG. 17A and FIG. 17B). The through channel 125 of the channel substrate 12 and the supply channel 131 of the pressure chamber substrate 13 together function as a pressure chamber.

The individual circulating channel 121 includes a connecting portion 122 communicating with the through channel 125 and an extension portion 123 extending from the connecting portion 122. The individual circulating channel 121 is a flow path in which an inlet of the connecting portion 122 is connected to the through channel 125, an outlet of the extension portion 123 is connected to the first common circulating channel 134, and the ink in the through channel 125 is discharged to the first common circulating channel 134. It is preferable that at least two individual circulation channels 121 are provided in each of the supply channels 131 from the viewpoint of facilitating the discharge of air bubbles and foreign matter together with the ink. In addition, as shown in FIG. 17A and FIG. 17B, for example, two individual circulation channels 121, one being placed in the forward direction and the other being placed in the rear direction of the supply channel 131, may be provided because it is possible to obtain an effect of easily discharging the air bubbles and the foreign matter together with the ink, and the manufacturing efficiency is high.

The silicon nozzle substrate 11 has an ink channel surface S1 and an ink ejection surface S2 facing the channel surface S1, and has the nozzles 111 penetrating from the channel surface S1 to the ejection surface S2. The channel substrate 12 is bonded to the channel surface S1 of the silicon nozzle substrate 11, and the liquid-repellent film 14 is provided on the ejection surface S2 of the silicon nozzle substrate 11. The nozzles 111 formed by the silicon nozzle substrate 11 are provided so as to correspond to the individual through channel 125 of the channel substrate 12. The configurations of the silicon nozzle substrate 11 and the liquid-repellent film 14 may be, for example, the same configurations as those in the above-described laminates 10A to 10D.

Here, the XVIIA-XVIIA cross-section (FIG. 17A) and the XVIIB-XVIIB cross-section (FIG. 17B) of the head chip 1 shown in FIG. 13 correspond to a cross-section obtained by cutting the head chip 1 in which the pressure chamber substrate 13, the channel substrate 12, the silicon nozzle substrate 11, and the liquid-repellent film 14 are stacked along a plane orthogonal to the channel surface S1 of the silicon nozzle substrate 11 so as to include the center of the nozzle 111 and the individual circulating channel 121. In the head chip 1, in the cross-section, the positional relationship between each of the individual circulation channels 121 and the nozzles 111 satisfies the above Expression 1.

[Ink Circulation System]

Figure 19:
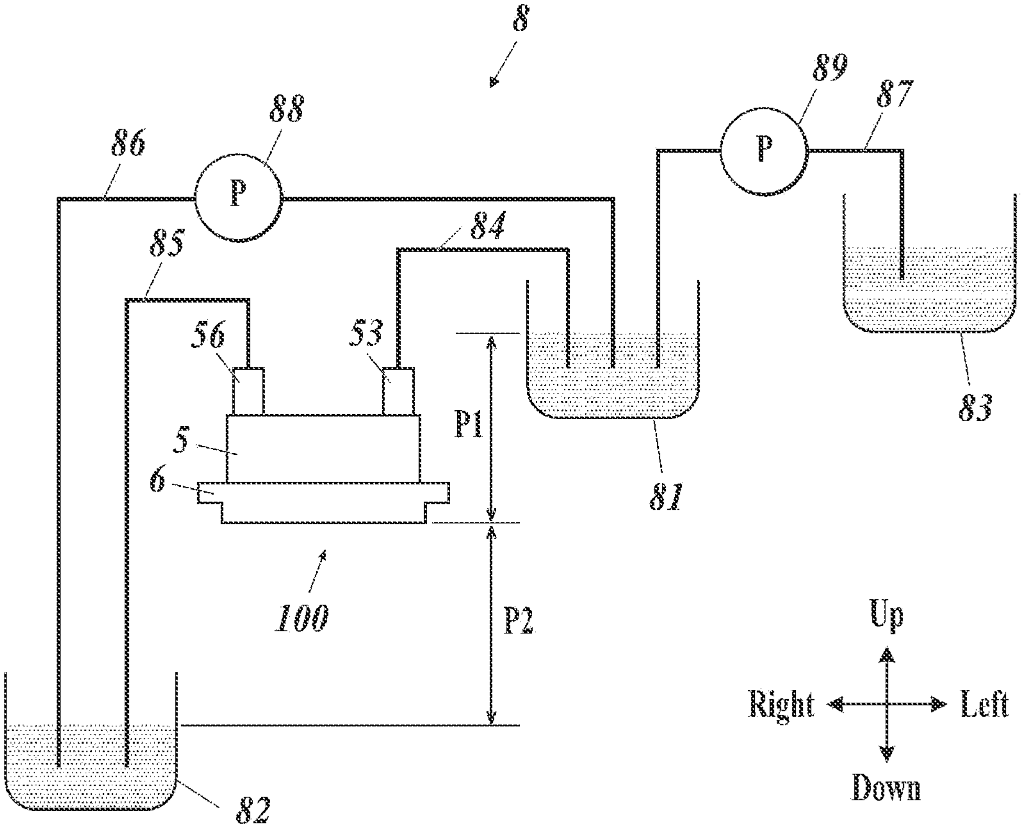
FIG. 19 This is a schematic diagram showing an ink circulation system.

The ink circulation system 8 is an ink supply unit for generating a circulation flow of an ink from a pressure chamber composed of a supply channel 131 and a through channel 125 in the inkjet head 100 to a common circulation channel 131 via individual circulation channels 121. The ink circulation system 8 includes a supply sub-tank 81, a circulation sub-tank 82, and a main tank 83 (FIG. 19).

The supply sub-tank 81 is filled with an ink to be supplied to the ink reservoir 51 of the manifold 5, and is connected to the first ink port 53 by an ink channel 84. The circulation sub-tank 82 is filled with the ink discharged from the discharge liquid chamber 57 of the manifold 5, and is connected to the fourth ink port 56 by an ink channel 85. The supply sub-tank 81 and the circulation sub-tank 82 are provided at different positions in the up-down direction (gravity direction) with respect to the nozzle surface (hereinafter also referred to as a "position reference surface") of the head chip 1. Accordingly, a pressure P1 due to a water head difference between the position reference surface and the supply sub-tank 81 and a pressure P2 due to a water head difference between the position reference surface and the circulation sub-tank 82 are generated. The supply sub-tank 81 and the circulation sub-tank 82 are connected to each other through an ink channel 86, and the pressure applied by the pump 88 may return the ink from the circulation sub-tank 82 to the supply sub-tank 81.

The main tank 83 is filled with an ink to be supplied to the supply sub-tank 81, and is connected to the supply sub-tank 81 by an ink channel 87. The ink may be supplied from the main tank 83 to the supply sub-tank 81 by the pressure applied by the pump 89.

In addition, it is possible to adjust the pressures P1 and P2 by appropriately changing the amount of the ink filled in each sub-tank and the position of each sub-tank in the up-down direction (gravity direction), and it is possible to circulate the ink in the inkjet head 100 at an appropriate circulating flow rate by the difference between the pressures P1 and P2. Accordingly, it is possible to remove bubbles and foreign matter generated in the head chip 1 and to suppress clogging of the nozzle 111 and ejection failure.

As an example of the ink circulation system 8, a method of controlling the circulation of the ink by the water head difference has been described. However, as long as the configuration is capable of generating a circulating flow of ink, it is naturally possible to change the configuration as appropriate.

[Production Method of Inkjet Head]

The inkjet head of the present invention may be produced by, for example, a production method including the following first to third steps.

- First step: A step of bonding a channel substrate to a channel surface of a silicon nozzle substrate
- Second step: After the first step, a step of forming a liquid-repellent film by vapor deposition by arranging a deposition source for the liquid-repellent film on the ejection surface side of the silicon nozzle substrate joined to the channel substrate.
- Third step: After the second step, a step of removing the liquid-repellent film formed on a formation surface of a through channel in a substrate body from the channel substrate side.

Further, after producing a laminate in which the channel substrate, the silicon nozzle substrate, and the liquid-repellent film are laminated by the above-described first to third steps, the pressure chamber substrate is bonded to the channel substrate side of the obtained laminate. Thereby, a head chip is obtained.

Hereinafter, with reference to FIG. 20 to FIG. 22, the first step to the third step will be described by taking as an example a case where a laminate 10D according to the present invention is manufactured as a laminate in which a channel substrate, a silicon nozzle substrate, and a liquid-repellent film are laminated. Among the reference symbols used in FIG. 20 to FIG. 22, the same reference symbols used in the laminate 10D shown in FIG. 7 have the same meanings as those in the case of the laminate 10D. In the following, only the reference symbols necessary for describing the manufacturing method are used for the description.

(First Step)

Figure 20:
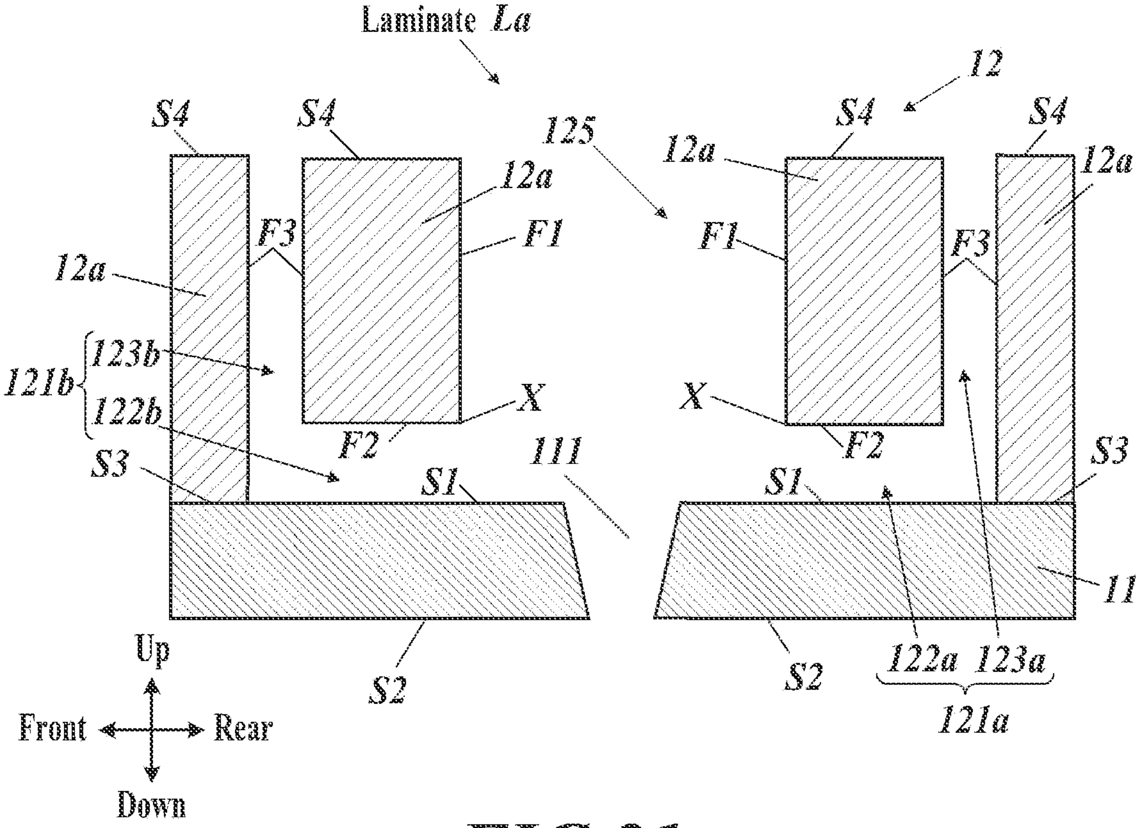
FIG. 20 This is a cross-sectional view after the first step in an example of the method for manufacturing an inkjet head of the present invention.

FIG. 20 is a cross-sectional view showing a laminate of the channel substrate 12 and the silicon nozzle substrate 11 obtained in the first step.

The first step is a step of bonding the channel substrate 12 in which the through channel 125 and the two individual circulating channel 121*a* and 121*b* are formed to the channel surface S1 of the silicon nozzle substrate 11 in which the nozzles 111 are formed.

The silicon nozzle substrate 11 is prepared, for example, by the following method. First, a silicon base substrate is prepared as abase member. The base substrate is composed of a first support layer having a thickness of 200 μm or more, a BOX layer, and a silicon nozzle substrate layer. The silicon nozzle substrate layer is a layer that becomes the silicon nozzle substrate 11. Next, a resist pattern is provided on the front face of the base substrate on the silicon nozzle substrate layer side (the face serving as the ejection face S2 of the silicon nozzle substrate 11) using a mask corresponding to the position where the nozzle 111 is to be formed, and the nozzle hole is processed by etching to form the nozzle 111. As the etching method, for example, reactive ion etching (RIE) by the Bosch method, which facilitates deep etching, is used. Note that laser perforation or blasting may be used (used in combination) to form the nozzle.

Next, a second support layer having a thickness of 200 μm or more, for example, is applied to the surface of the base substrate on the side of the silicon nozzle substrate layer (the surface serving as the ejection surface S2 of the silicon nozzle substrate 11) in which the nozzle holes that will become the nozzles 111 are formed in the silicon nozzle substrate layer. After that, the first support layer and the BOX layer are removed to obtain the silicon nozzle substrate 11 with the second support layer, in which the channel surface S1 side of the silicon nozzle substrate 11 is exposed.

The channel substrate 12 is obtained by forming the through channel 125 and the two individual circulating channels 121*a* and 121*b* at positions illustrated in FIG. 10 and FIG. 11 on a base substrate serving as a base member by a known method, thereby obtaining the channel substrate 12 including the through channel 125 which is a flow path of the ink, the two individual circulating channels 121*a* and 121*b*, and the substrate body 12*a* having the formation surfaces (F1 to F3) of these flow paths.

The first step is performed by, for example, joining the channel surface S2 of the silicon nozzle substrate 11 with the second support layer and the lower surface S3 of the substrate body 12*a* of the channel substrate 12, and then removing the second support layer. The use of the second support layer is useful in protecting the silicon nozzle substrate 11, especially when the thickness of the silicon nozzle substrate 11 is about 10 to 100 μm. If necessary, the silicon nozzle substrate 11 and the channel substrate 12 may be bonded without using the second support layer.

The channel substrate 12 and the silicon nozzle substrate 11 may be joined by using, for example, a known adhesive. The adhesive is appropriately selected and used from known adhesives according to the constituent material of each substrate. Specific examples of the commercially available epoxy adhesive include Epotek 353ND (manufactured by Epoxy Technology Co., Ltd.). Hereinafter, a laminate of the channel substrate 12 and the silicon nozzle substrate 11 is referred to as a laminate La.

(Second Step)

Figure 21:
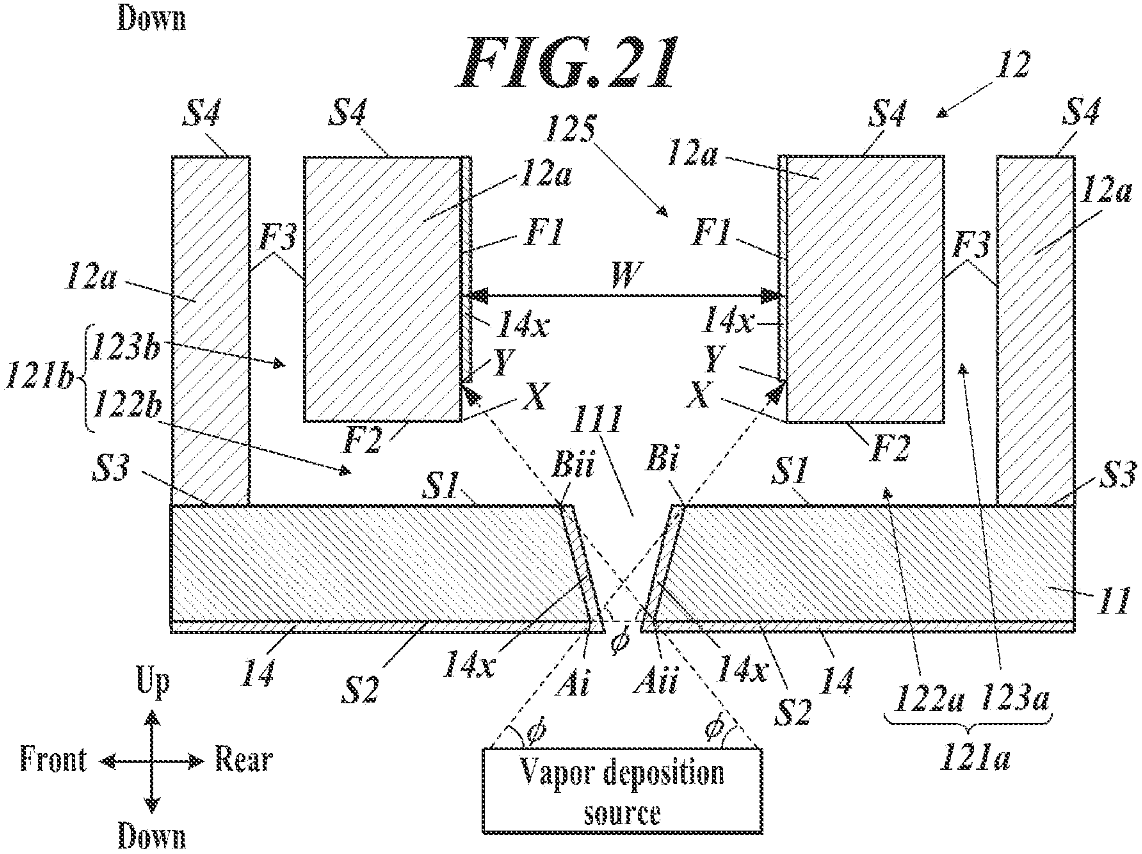
FIG. 21 This is a cross-sectional view after the second step in an example of the method for manufacturing an inkjet head of the present invention.

FIG. 21 is a cross-sectional view showing a laminate La with a liquid-repellent film obtained by forming a liquid-repellent film in the second step on the laminate La composed of the channel substrate 12 and the silicon nozzle substrate 11 obtained in the first step.

The second step is a step of forming the liquid-repellent film 14 by vapor deposition by arranging a vapor deposition source of the liquid repellent film 14 on the ejection surface S2 side of the silicon nozzle substrate 11 in the laminate La.

In FIG. 21, the liquid-repellent film to be removed in the third step is indicated as the liquid-repellent film 14*x*, and the liquid-repellent film formed on the ejection surface S2 side of the silicon nozzle substrate 11 which is not removed after the third step is indicated as the liquid-repellent film 14. That is, in the second step, the liquid-repellent film 14*x* is formed together with the liquid repellent film 14.

As the liquid-repellent film 14, for example, a liquid-repellent film made of a fluoropolymer layer is exemplified. Hereinafter, a case of forming a liquid-repellent film formed of a fluoropolymer layer will be described as an example, but the liquid-repellent film is not limited thereto, and a known liquid-repellent film may be used.

As the vapor deposition source of the liquid-repellent film, the liquid-repellent agent described above may be used. As shown in FIG. 21, vapor deposition of the liquid-repellent agent in the second step is performed from the ejection surface S2 side of the silicon nozzle substrate 11. By vapor deposition, the liquid-repellent agent adheres to the ejection surface S2 of the silicon nozzle substrate 11 and the internal wall surface (formation surface) of the nozzle 111, enters the inside of the channel substrate 12 from the nozzle 111, and adheres to the internal wall surface of the substrate body 12*a*.

As described in the laminate 10D, the positional relationship between the inlet of the connecting portion 122*a* of the individual circulating channel 121*a* and the nozzle 111 satisfies Expression 1. FIG. 21 schematically shows a vapor deposition source. The vapor deposition source is, for example, a heatable container containing a liquid-repellent agent, and the heated container containing the liquid-repellent agent moves in the front-rear direction, or the laminated body La moves in the front-rear direction on the container. Thereby, vapor deposition is performed on the entire ejection surface S2 of the silicon nozzle substrate 11 of the laminate La. In the positional relationship between the laminate La and the container in FIG. 21, when vapor deposition of the liquid-repellent agent is performed, the state in which vapor of the liquid-repellent agent from both ends of the container advances from the end Ai on the ejection surface S2 side of the nozzle 111 through the end Bi on the channel surface S2 side to the inside of the channel substrate 12, and the state in which vapor of the liquid-repellent agent advances from the end Aii on the ejection surface S2 side of the nozzle 111 through the end Bii on the channel surface S2 side to the inside of the channel substrate 12 are indicated by broken line arrows.

As shown in FIG. 21, in the channel substrate 12, the liquid-repellent agent does not adhere to the inner wall surface below the position Y at the height of L×tan ϕ from the ejection surface S2, but adheres to the inner wall surface above it. Specifically, it adheres to the inner wall surface above the position Y of the formation surface F1 of the through channel 125 in the substrate body 12*a*.

Then, by performing processing such as drying and curing on the attached liquid-repellent agent, the liquid-repellent film 14*x* is formed at the location where the liquid-repellent agent is attached as shown in FIG. 21. Similarly, as shown in FIG. 21, the liquid-repellent film 14*x* and the liquid-repellent film 14 are formed from the liquid-repellent agent attached to the ejection surface S2 of the silicon nozzle substrate 11 and the inner surface (formation surface) of the nozzle 111. Further, since the inlets of the connecting portions 122*a* and 122*b* of the individual circulating channels 121*a* and 121*b* are entirely located below the position Y at the height of L×tan ϕ, the liquid-repellent agent does not adhere to the formation surface F2 of the connecting portions 122*a* and 122*b* of the individual circulation channels 121*a* and 121*b* and the channel surface S1 corresponding to the lower surface of the connecting portions 122*a* and 122*b* in the substrate body 12*a*. Furthermore, the vapor of the liquid-repellent agent does not reach the extension portions 123*a* and 123*b* of the individual circulation channels 121*a* and 121*b*, and the liquid-repellent film is not formed on the formation surfaces F3 of the extension portions 123*a* and 123*b*.

The drying and curing is usually performed by heating. Appropriate conditions are determined depending on the type of the liquid-repellent agent, and the heat treatment is performed at room temperature or in a high temperature state (for example, 300 to 400° C.) as necessary. Thereafter, for the purpose of removing an unreacted raw material, for example, a raw material fluoropolymer, cleaning (rinsing) with a fluorine-based solvent (hydrofluoroether) is preferably performed, and the cleaning is more preferably performed by ultrasonic cleaning.

The liquid-repellent film 14 preferably includes a base layer containing a silicon compound between the formation surface thereof and the fluoropolymer layer. The base layer is formed between the first step and the second step. The base layer is formed by a known method such as vapor deposition or sputtering depending on the type of the constituent material. The formation range of the base layer is at least a range in which the liquid-repellent film 14 is formed. The base layer may be formed on a surface other than the range in which the liquid-repellent film 14 is formed, for example, on a part or the entirety of the surface on which the nozzles 111 of the silicon nozzle substrate 11 are formed or the inner wall surface of the channel substrate 12 as necessary.

(Third Step)

Figure 22:
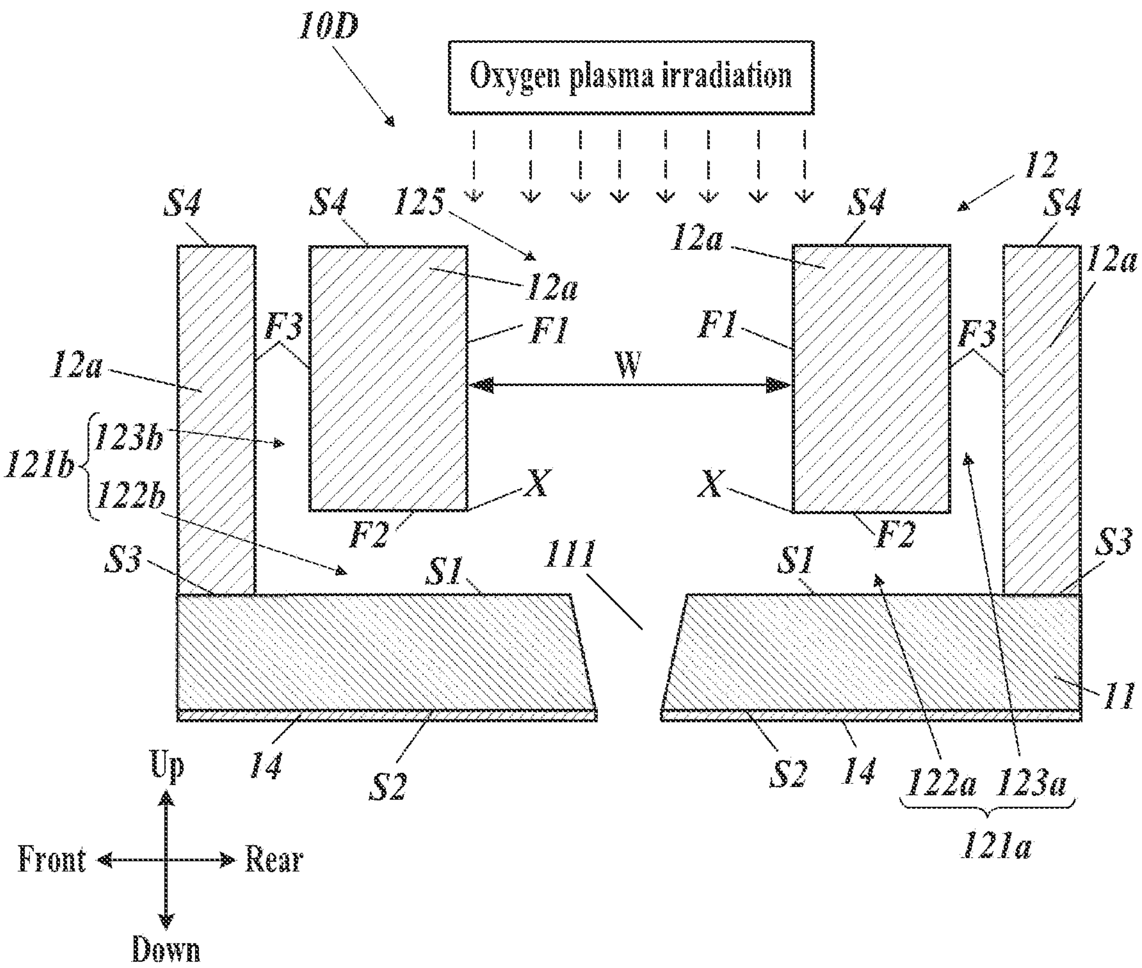
FIG. 22 This is a cross-sectional view after the third step in an example of the method for manufacturing an inkjet head of the present invention.

FIG. 22 is a cross-sectional view showing a laminate 10D obtained by removing the liquid-repellent film 14*x* from the laminate La with the liquid-repellent film obtained in the second step.

The third step is a step of removing the liquid-repellent film 14*x* formed on the formation surface F1 of the through channel 125 in the substrate body 12*a* from the upper surface S4 side of the channel substrate 12 after the second step. In FIG. 22, the liquid-repellent film 14*x* is removed by performing oxygen plasma irradiation from the upper surface S4 side of the channel substrate 12. At this time, the liquid-repellent film 14*x* formed on the surface of the silicon nozzle substrate 11 on which the nozzles 111 are formed is also removed. In this method, the liquid-repellent film 14 formed on the ejection surface S2 of the silicon nozzle substrate 11 is not removed.

Examples of the method of removing only the liquid-repellent film 14*x* while leaving the liquid-repellent film 14 include UV ozone irradiation in addition to the oxygen plasma irradiation. Since these methods are carried out by irradiating active rays having rectilinear properties, it is possible to selectively remove the liquid-repellent film.

In the method of irradiating the active ray having the straightness, the irradiation does not reach the portion overlapping the substrate body 12*a* when viewed from the upper side of the channel substrate 12. Therefore, if a liquid-repellent film is formed on the formation surface F2 of the connecting portions 122*a* and 122*b* of the individual circulation channels 121*a* and 121*b* and the portion of the channel surface S1 corresponding to the lower surface of the connecting portions 122*a* and 122*b*, it is almost not possible to remove the liquid-repellent film by this method. In the cross-section shown in FIG. 21, as described above, the liquid-repellent film is not formed on the formation surface F2 of the connecting portions 122*a* and 122*b* of the individual circulation channels 121*a* and 121*b*, and on the portion of the channel surface S1 corresponding to the lower surface of the connecting portions 122*a* and 122*b*. Therefore, by the method of irradiating the active ray having rectilinear properties from the upper side of the channel substrate 12, it is possible to remove substantially all of the liquid-repellent film formed on the inner surface of the channel substrate 12. In addition, by this method, it is also possible to remove the liquid-repellent film formed on the formation surface of the nozzle 111.

In this way, as shown in the cross-section of FIG. 22, a laminate 10D having the liquid-repellent film 14 formed only on the ejection surface S2 of the silicon nozzle substrate 11 is obtained.

INDUSTRIAL APPLICABILITY

According to the present invention, it is possible to provide an inkjet head including a silicon nozzle substrate having a liquid-repellent film on an ejection surface side and a channel substrate having a circulation channel, in which formation of the liquid-repellent film in the channel substrate is suppressed and thus excellent in ink ejection properties, and it is also possible to provide a method for manufacturing an inkjet head in which formation of the liquid-repellent film in the channel substrate during manufacturing is suppressed. Further, it is possible to provide an inkjet recording apparatus equipped with an inkjet head having excellent ink ejectability.

REFERENCE SIGNS LIST

1: Head chip
11: Silicon nozzle substrate
111: Nozzle
12: Channel substrate
12*a*: Substrate body
121: Individual circulation channel
122: Connecting portion
123: Extension portion
125: Through channel
10A, 10B, 10C, 10D: Laminate of liquid-repellent film, silicon nozzle substrate, and channel substrate
13: Pressure chamber substrate
131: Supply channel
132: Air chamber
126, 133: Common circulation channel
134: First common circulation channel
135: Second common circulation channel
136: Partition wall
14: Liquid-repellent film
5: Manifold
8: Ink circulation system
100: Inkjet head
200: Inkjet recording apparatus

The invention claimed is:

1. An inkjet head comprising: a silicon nozzle substrate having an ink channel surface and an ink ejection surface facing the channel surface, and having a nozzle penetrating from the channel surface to the ejection surface; a channel substrate bonded to the channel surface of the silicon nozzle substrate, and including an ink channel and a substrate body that forms the ink channel; and a liquid-repellent film provided on the ejection surface of the silicon nozzle substrate, wherein the channel substrate includes, as a channel for the ink, a through channel that penetrates the substrate body so as to face the nozzle, n-number of individual circulation channels that communicate with the through channel, extend in a direction away from the nozzle, and have a portion overlapping the substrate body in a plan view seen from an opposite surface side of the channel substrate bonded to the silicon nozzle substrate; and a positional relationship between each of the individual circulation channels and the nozzle satisfies the following Expression 1, $$L \times \tan \phi > H1, \quad \text{Expression 1:}$$

wherein each symbol in Expression 1 has the following meanings in a cross-section obtained by cutting the silicon nozzle substrate and the channel substrate along a plane orthogonal to the channel surface of the silicon nozzle substrate so as to include a center of the nozzle and the individual circulation channel, $\phi$: an angle formed by a straight line connecting a first nozzle end located on the ejection surface that is farther from the individual circulation channel and a second nozzle end located on the channel surface that is closer to the individual circulation channel with the ejection surface, L: a distance from a straight line orthogonal to the ejection surface including the first nozzle end to an intersection farthest from the channel surface among intersections of a formation surface of the through channel and a formation surface of the individual circulation channel in the substrate body, H1: a distance from the ejection surface to an intersection farthest from the channel surface among the intersections of a formation surface of the through channel and a formation surface of the individual circulation channel in the substrate body.

2. The inkjet head according to claim 1, wherein a diameter of the nozzle gradually decreases from the channel surface toward the ejection surface, and $\phi$ in Expression 1 is a maximum angle among angles formed with a straight line connecting the first nozzle end and an end of each stage on the channel surface side and close to the individual circulation channel with the ejection surface.

3. The inkjet head according to claim 1, wherein at least two individual circulation channels are positioned on a straight line passing through a center of the nozzle on the channel surface;

the centers of the nozzle and the through channel are aligned, and in a cross-section cut along a plane orthogonal to the channel surface of the silicon nozzle substrate so as to include the nozzle, the center of the through channel, and the two individual circulation channels, the two individual circulation channels are in a symmetrical relationship; and the positional relationship of the individual circulation channels, the through channel, and the nozzles satisfies the following Expression 2, $$(W - D2)/(D1 + D2) \times t > H2 \quad \text{Expression 2:}$$

D1: a diameter of the nozzle on the ejection surface
D2: a diameter of the nozzle on the channel surface
t: a thickness of the silicon nozzle substrate
H2: a distance from the channel surface to an intersection farthest from the channel surface among the intersections of a formation surface of the through channel and a formation surface of the individual circulation channel in the substrate body, W: a width of the through channel.

4. The inkjet head according to claim 1, wherein the liquid-repellent film is formed with a vapor deposition method.

5. The inkjet head according to claim 1, wherein the silicon nozzle substrate and the channel substrate are bonded with an adhesive.

6. The inkjet head according to claim 1, wherein the liquid-repellent film is composed of a base layer containing a silicon compound and a fluoropolymer layer provided in that order from the silicon nozzle substrate side.

7. The inkjet head according to claim 1, wherein the silicon nozzle substrate has a thickness in the range of 10 to 100 μm.

8. A method for producing the inkjet head according to claim 1, comprising the steps of:

a first step of bonding the channel substrate to the channel surface of the silicon nozzle substrate;

after the first step, a second step of forming the liquid-repellent film by a vapor deposition method by arranging a deposition source for the liquid-repellent film on the ejection surface side of the silicon nozzle substrate bonded to the channel substrate;

after the second step, a third step of removing the liquid-repellent film formed on a formation surface of the through channel in the substrate body from the channel substrate side.

9. The method for producing the inkjet head according to claim 8, wherein the removal of the liquid-repellent film is performed by irradiating UV ozone or oxygen plasma to the formation surface of the through channel in the substrate body.

10. An inkjet recording apparatus equipped with the inkjet head according to claim 1.

* * * * *